United States Patent
Murphy et al.

(10) Patent No.: US 9,638,216 B1
(45) Date of Patent: May 2, 2017

(54) DISCRETIZED VALVE STATE CONTROL FOR MULTI-LEVEL HYDRAULIC SYSTEMS

(71) Applicant: Google Inc., Mountain View, CA (US)

(72) Inventors: Michael Murphy, Arlington, MA (US); John Aaron Saunders, Arlington, MA (US); Steven D. Potter, Bedford, MA (US)

(73) Assignee: Google Inc., Mountain View, CA (US)

(*) Notice: Subject to any disclaimer, the term of this patent is extended or adjusted under 35 U.S.C. 154(b) by 149 days.

(21) Appl. No.: 14/447,796

(22) Filed: Jul. 31, 2014

(51) Int. Cl.
| | |
|---|---|
| *F15B 11/16* | (2006.01) |
| *G05D 1/02* | (2006.01) |
| *B62D 57/032* | (2006.01) |
| *B25J 9/20* | (2006.01) |
| *F15B 11/18* | (2006.01) |
| *F15B 11/22* | (2006.01) |

(52) U.S. Cl.
CPC .............. *F15B 11/162* (2013.01); *B25J 9/20* (2013.01); *B62D 57/032* (2013.01); *F15B 11/18* (2013.01); *F15B 11/22* (2013.01); *G05D 1/021* (2013.01)

(58) Field of Classification Search
CPC ............ F15B 11/028; F15B 2211/6313; F15B 2211/6653; F15B 2211/7107; F15B 11/16; F15B 2211/761; F15B 11/162; F15B 11/22; F15B 11/18; B25J 9/20; B62D 57/032; G05D 1/021
See application file for complete search history.

(56) References Cited

U.S. PATENT DOCUMENTS

| | | | |
|---|---|---|---|
| 3,815,622 | A | 6/1974 | Allen |
| 5,218,895 | A | 6/1993 | Lukich et al. |
| 5,829,335 | A | 11/1998 | Ewald et al. |
| 6,035,828 | A | 3/2000 | Anderson et al. |
| 6,113,642 | A | 9/2000 | Petrofsky et al. |

(Continued)

FOREIGN PATENT DOCUMENTS

EP    0035282 B1    7/1987

OTHER PUBLICATIONS

Andruch, et al., Design, Simulation and Control of Hydraulic System Topographies with Integrated Energy Recovery, National Fluid Power Association, Oct. 2011, 13 pages.

(Continued)

*Primary Examiner* — Jason Holloway
(74) *Attorney, Agent, or Firm* — McDonnell Boehnen Hulbert & Berghoff LLP

(57) ABSTRACT

An actuation pressure to actuate one or more hydraulic actuators may be determined based on a load on the one or more hydraulic actuators of a robotic device. Based on the determined actuation pressure, a pressure rail from among a set of pressure rails at respective pressures may be selected. One or more valves may connect the selected pressure rail to a metering valve. The hydraulic drive system may operate in a discrete mode in which the metering valve opens such that hydraulic fluid flows from the selected pressure rail through the metering valve to the one or more hydraulic actuators at approximately the supply pressure. Responsive to a control state of the robotic device, the hydraulic drive system may operate in a continuous mode in which the metering valve throttles the hydraulic fluid such that the supply pressure is reduced to the determined actuation pressure.

20 Claims, 15 Drawing Sheets

(56) References Cited

U.S. PATENT DOCUMENTS

| | | | |
|---|---|---|---|
| 6,938,535 B2 | 9/2005 | Price | |
| 7,729,796 B2 | 6/2010 | Hartrampf et al. | |
| 7,831,352 B2 | 11/2010 | Laumer et al. | |
| 8,102,134 B1* | 1/2012 | Theobald | B25J 5/005 318/568.11 |
| 8,469,424 B2 | 6/2013 | Takenaka et al. | |
| 8,585,776 B2 | 11/2013 | Lind et al. | |
| 8,726,646 B2 | 5/2014 | Riedel et al. | |
| 9,283,949 B2* | 3/2016 | Saunders | B25J 3/04 |
| 2001/0054351 A1* | 12/2001 | Pratt | F15B 9/09 91/361 |
| 2003/0213238 A1* | 11/2003 | Smith | E02F 9/2217 60/413 |
| 2006/0197485 A1* | 9/2006 | Kawai | B62D 57/032 318/568.12 |
| 2007/0193789 A1* | 8/2007 | Takenaka | B25J 19/0091 180/8.1 |
| 2008/0210477 A1* | 9/2008 | Takenaka | B25J 19/0012 180/8.6 |
| 2009/0210091 A1* | 8/2009 | Takenaka | B25J 19/0091 700/245 |
| 2010/0090638 A1* | 4/2010 | Saunders | B25J 9/144 318/568.12 |
| 2010/0107864 A1* | 5/2010 | Bushner | F15B 15/18 91/422 |
| 2011/0196509 A1* | 8/2011 | Jansen | B25J 9/109 623/26 |
| 2012/0233997 A1 | 9/2012 | Andruch, III et al. | |
| 2012/0291873 A1* | 11/2012 | Potter | F15B 11/028 137/12 |

OTHER PUBLICATIONS azorobotics.com, "Pneumatic and Hydraulic Actuators", 2014, pp. 1-4.

Bauchspiess et al., "Predictive sensor guided robotic manipulators in automated welding cells,", Journal of Materials Processing Technology, 2001, vol. 109, pp. 13-19.

Hu et al., "Generalised Predictive Control of an Industrial Mobile Robot," Proceeds of the IASTED International Conference, Intelligent Systems and Control, Oct. 28-30, 1999, pp. 235-240.

Ponomareva, Elena, "Course 5: Mechatronics—Foundations and Applications, Hydraulic and Pneumatic Actuators and their Application," Mechatronics, May 26, 2006, pp. 1-24.

Sepehri et al., "Experimental evaluation of generalized predictive control applied to a hydraulic actuator," Cambridge Journals Online, 1998, vol. 16, pp. 463-474.

Shen, et al., "Energy-Saving Analysis of Hydraulic Hybrid Excavator Based on Common Pressure Rail," The Scientific World Journal, 2013, vol. 2013, pp. 1-12.

Andruch, et al., Design, Simulation and Control of Hydraulic System Topographies with Integrated Energy Recovery, National Fluid Power Association, 2011.

Shen, et al., Energy-Saving Analysis of Hydraulic Hybrid Excavator Based on Common Pressure Rail, The Scientific World Journal, 2013, 2013, 12.

* cited by examiner

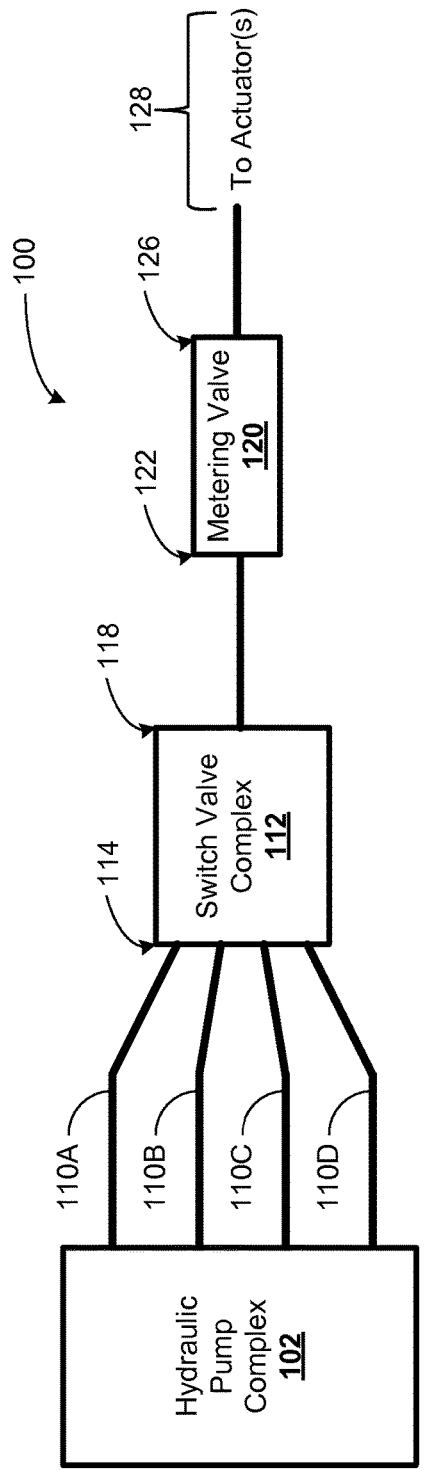
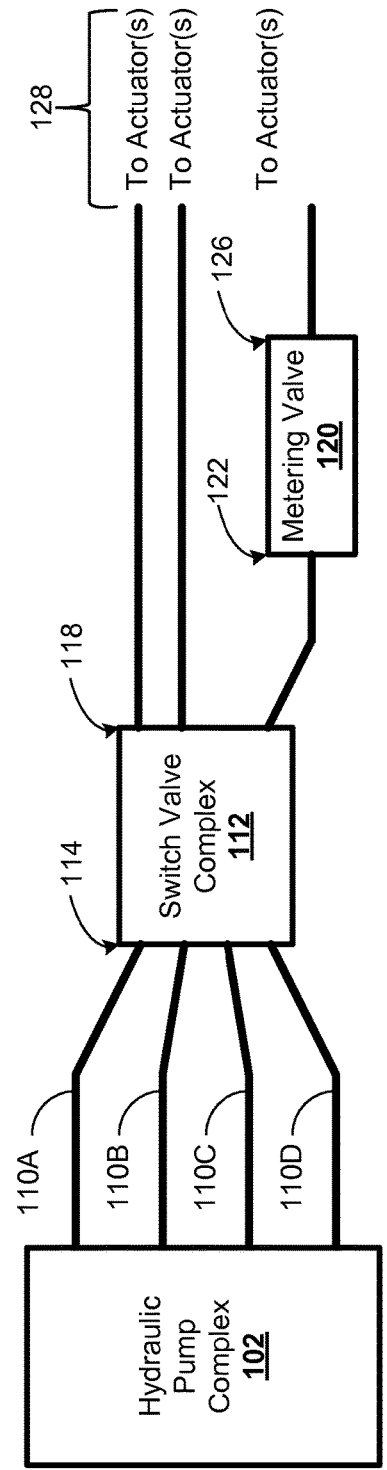

DISCRETIZED VALVE STATE CONTROL FOR MULTI-LEVEL HYDRAULIC SYSTEMS

BACKGROUND

A robotic device, such as a legged robot, may have a hydraulic drive system which, in operation, supplies pressurized hydraulic fluid to hydraulic actuators on the robotic device. For instance, the robotic device may have robotic arms and/or legs driven by linear hydraulic actuators (e.g., hydraulic piston-cylinder assemblies). Pressurized hydraulic fluid may cause the linear hydraulic actuators to actuate and thereby move the robotic arms and/or legs. An example legged robot may have one or more hydraulic actuators on each leg (e.g., hip, knee, and ankle actuators). A pump of the hydraulic drive system may pressurize hydraulic fluid. The hydraulic drive system may supply the pressurized hydraulic fluid to the hydraulic actuators on each leg. The hydraulic actuators may convert the pressure of the hydraulic fluid into force that moves the actuators, thus causing the legged robot to walk or run.

SUMMARY

In one example implementation, a hydraulic drive system of a robotic device may include a source of pressurized hydraulic fluid including pressure rails at respective pressures. The pressure rails may include a first pressure rail configured to be pressurized at a first pressure, and a second pressure rail configured to be pressurized at a second pressure, where the second pressure is higher than the first pressure. The hydraulic drive system may also include a switch valve complex selectively operable between a discrete mode or a continuous mode, the switch valve complex. The switch valve complex may include hydraulic fluid inputs of the switch valve complex, where the hydraulic fluid inputs of the switch valve complex include a first hydraulic fluid input coupled to the first pressure rail and a second hydraulic fluid input coupled to the second pressure rail, a hydraulic fluid output of the switch valve complex, and a hydraulic fluid switch that selectively connects one of the hydraulic fluid inputs of the switch valve complex to the hydraulic fluid output of the switch valve complex. The switch valve complex may further include a metering valve comprising an adjustable throttle coupled between the one of the hydraulic fluid inputs and the hydraulic fluid output, where the adjustable throttle is substantially open in the discrete mode, and wherein the adjustable throttle is configured to meter the pressurized hydraulic fluid in the continuous mode.

In another example implementation, an actuation pressure to actuate one or more hydraulic actuators may be determined based on a load on the one or more hydraulic actuators of a robotic device. Based on the determined actuation pressure, a pressure rail from among a set of pressure rails at respective pressures may be selected, where the selected pressure rail supplies pressurized hydraulic fluid at a supply pressure, and where the supply pressure is, among the respective pressures, at a lowest pressure that exceeds the determined actuation pressure. One or more valves may connect the selected pressure rail to a metering valve such that hydraulic fluid at approximately the supply pressure flows from the selected pressure rail to the metering valve. The hydraulic drive system may operate in a discrete mode in which the metering valve opens such that hydraulic fluid flows from the selected pressure rail through the metering valve to the one or more hydraulic actuators at approximately the supply pressure. Responsive to a control state of the robotic device, the hydraulic drive system may operate in a continuous mode in which the metering valve throttles the hydraulic fluid such that the supply pressure is reduced to approximately the determined actuation pressure.

Another example implementation may involve receiving, by a control system of a robotic device, data indicating a magnitude of a load on a hydraulic actuator. Based on the magnitude of the load on the hydraulic actuator, an actuation pressure to actuate the load may be determined. The control system may cause one or more valves to select one of a first pressure rail at a first pressure or a second pressure rail at a second pressure, where the second pressure is higher than the first pressure. The method also involves determining, by the control system, that a pressure difference between the pressure of the selected pressure rail and the determined actuation pressure exceeds a tolerated pressure difference. Responsive to the determination that the pressure difference exceeds the tolerated pressure difference, a metering valve may throttle a flow of hydraulic fluid from the selected pressure rail to the hydraulic actuator such that the hydraulic fluid is at a throttled pressure that is within the tolerated pressure difference from the determined actuation pressure.

Another example implementation may include a means for determining an actuation pressure to actuate the one or more hydraulic actuators based on a load on one or more hydraulic actuators of a robotic device. The implementation may include a means for selecting a pressure rail from among a set of pressure rails at respective pressures based on the determined actuation pressure, where the selected pressure rail supplies pressurized hydraulic fluid at a supply pressure, and where the supply pressure is, among the respective pressures, at a lowest pressure that exceeds the determined actuation pressure. The implementation may further include a means for causing one or more valves to connect the selected pressure rail to a metering valve such that hydraulic fluid at approximately the supply pressure flows from the selected pressure rail to the metering valve. The implementation may also include a means for causing the hydraulic drive system to operate in a discrete mode in which the metering valve opens such that hydraulic fluid flows from the selected pressure rail through the metering valve to the one or more hydraulic actuators at approximately the supply pressure. The implementation may further include a means for causing the hydraulic drive system to operate in the continuous mode in which the metering valve throttles the hydraulic fluid such that the supply pressure is reduced to approximately the determined actuation pressure.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 2A is a simplified block diagram illustrating hydraulic fluid interconnections between components of the example hydraulic drive system.

FIG. 2B is a simplified block diagram illustrating alternative hydraulic fluid interconnections between components of the example hydraulic drive system.

DETAILED DESCRIPTION

Figure 1:
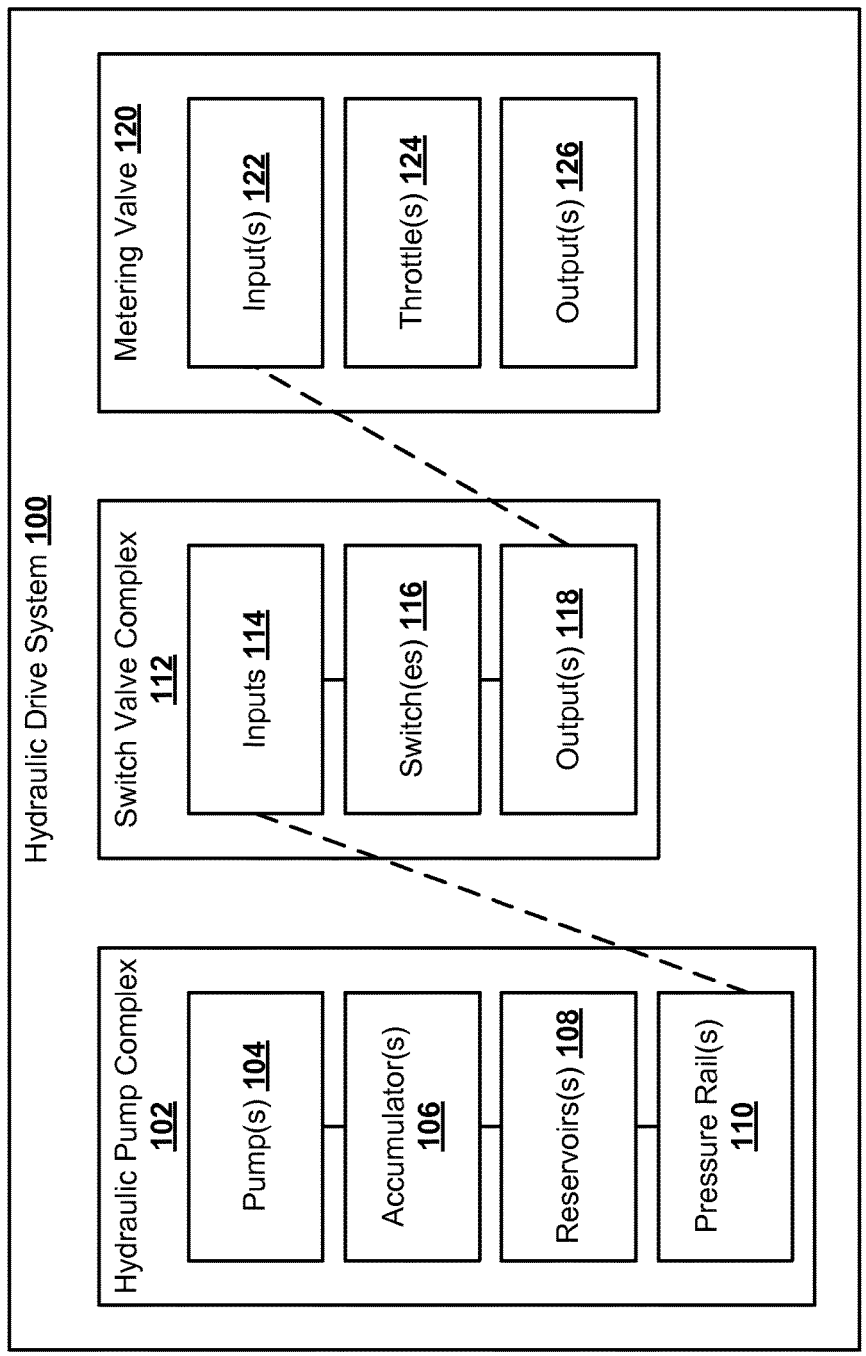
FIG. 1 is a simplified block diagram illustrating components of an example hydraulic drive system.

Example methods and systems are described herein. Any example implementation or feature described herein is not necessarily to be construed as preferred or advantageous over other implementations or features. The example implementations described herein are not meant to be limiting. Certain aspects of the disclosed systems and methods can be arranged and combined in a wide variety of different configurations, all of which are contemplated herein.

Furthermore, the particular arrangements shown in the figures should not be viewed as limiting. Other implementations might include more or less of each element shown in a given figure. Further, some of the illustrated elements may be combined or omitted. Yet further, an example implementation may include elements that are not illustrated in the figures.

Example implementations provide for hydraulic drive systems that combine discretized pressure rails at different pressures with metering. For instance, such a hybrid discretized and metered hydraulic drive system may include four selectable pressure rails providing 3000 PSI, 1500 PSI, 750 PSI, and 300 PSI, respectively, in which one or more of the pressure rails can be metered to lower the supply pressure. Such a hybrid hydraulic drive system may be implemented in a robotic device, such as the example legged robot noted above.

The amount of force involved in performing an operation with hydraulic actuators of the robotic device may vary over time. For instance, a legged robotic device may walk according to a gait (i.e., a pattern of movement). Such a gait may involve lifting a leg up, stepping forward, and setting the leg back down to make contact with the ground. Lifting the leg up may take less force than setting the leg back down to make contact with the ground, since the load of the robotic device may be on another member (e.g., one or more of the other legs) while the leg is lifted. Then, when the leg makes contact with the ground, the load on the hydraulic actuators increases from only the leg itself to at least a portion of the weight of the robotic device. Accordingly, to produce the gait, the hydraulic drive system may adjust the pressure of supplied hydraulic fluid to the actuators in proportion to the varying forces involved in actuating the hydraulic actuators.

Further, the robotic device may repeat the gait as the robot walks or runs. Accordingly, the robotic device may provide varying pressures that repeat in a cycle.

As noted above, some operations performed by a robotic device may involve supplying pressurized hydraulic fluid at varying pressures. Some hydraulic systems vary pressure by varying the speed of the hydraulic pump, which may in turn raise or lower the pressure of hydraulic fluid supplied by the hydraulic drive system. Varying the pressure by varying the speed of the pump can be time-consuming, as the pump might not be able to instantaneously increase or decrease speed. Other hydraulic systems may supply the lower pressure by metering (throttling) the output of the hydraulic pump. Such metering may produce quicker adjustments in pressure because a throttle may be capable of quicker adjustments than a pump. However, such metering may be inefficient because metering causes throttling losses in proportion to the amount by which the hydraulic fluid pressure is metered. Moreover, metering produces waste heat, which, in some cases, may require additional energy to dissipate. Applications that involve a wide variance in load (i.e., including both large and small loads) can be especially inefficient when the high pressure supplied to handle the large load is metered down to handle the small load. This may result in relatively large throttling losses.

Discretized hydraulic drive systems may include two or more discrete pressure rails (e.g., pipes or tubes) having different pressure levels. For instance, an example discretized hydraulic drive system may include four selectable pressure rails providing 3000 PSI, 1500 PSI, 750 PSI, and 300 PSI, respectively. A control system may switch between the pressure rails in an attempt to match the supply pressure (to a particular actuator) to the force involved in a given operation. The force involved in actuating a load is proportional to the load and the rate of actuation. Heavier loads and faster actuations require higher pressure than smaller loads and slower actuations. In one example, the legged robot may be programmed to perform a first motion that involves actuating a load requiring 2500 PSI of supply pressure. To actuate this load, the control system may select the 3000 PSI pressure rail, as the 3000 PSI pressure rail is sufficient to actuate the load. When the legged robot is performing a second motion that involves actuating a smaller load requiring 200 PSI of supply pressure, the control system may select the 300 PSI pressure rail, as the 300 PSI pressure rail is sufficient to actuate the smaller load. Such a hydraulic drive system avoids throttling losses inherent in metering.

However, as illustrated above, in some situations, operation using a discretized hydraulic drive system may result in a mismatch between the load and the supplied pressure. In the case of a legged robot driven by linear hydraulic actuators, the differences between the supplied pressure and the load may cause the gait produced by this type of hydraulic drive system to be relatively more rough and jerky than the gait produced by a metered hydraulic drive system. For instance, if the hydraulic drive system supplies more pressure than called for by the load (e.g., supplying 3000 PSI for a load requiring 2500 PSI), the additional pressure may result in increased acceleration of the actuator (as acceleration of a hydraulic actuator is proportional to pressure). Further, the desired actuator load varies with the terrain, creating mismatches of varying degree between the desired and the supplied load.

In comparison, the metered hydraulic drive system may produce a smoother gait as compared with the discretized hydraulic drive system because such a metered system may match the desired and delivered pressure with the loads more precisely. However, unlike the metered hydraulic drive system, a discretized hydraulic drive system does not produce throttling losses.

A hybrid hydraulic drive system may have discrete pressure rails and metering. For instance, one or more of the discrete pressure rails may be metered to vary the pressure delivered to an actuator. Compared with conventional, metered hydraulic systems, a hybrid hydraulic drive system may reduce throttling losses inherent in metering by reducing the pressure difference between the supply pressure and the load. In the example noted above, the legged robotic device may perform a first motion that involves actuating a load requiring 2500 PSI and may also perform a second motion that involves actuating a smaller load requiring 200 PSI. In such a situation, the hydraulic drive system may select the 3000 PSI pressure rail to actuate the 2500 PSI load and the 300 PSI pressure rail to actuate the smaller, 200 PSI load. Compared with a hydraulic drive system having a single pressure rail at 3000 PSI, the pressure difference between the load and supply pressure for actuating the second load is much lower with the hybrid system. Rather than a pressure difference of 2800 PSI (3000 PSI–200 PSI), the pressure difference is 100 PSI (300 PSI–200 PSI). Further, as the discrete pressure rails may be metered to more closely track the load, such a hybrid hydraulic drive system on a legged robot may produce a smoother gait than a discretized hydraulic system.

Referring now to the figures, FIG. 1 is a simplified block diagram illustrating components of an example hydraulic drive system 100. Hydraulic drive system 100 includes a hydraulic pump complex 102, a switch valve complex 112, and a metering valve 120. The hydraulic pump complex may connect to the switch valve complex, which may in turn connect to the metering valve.

The hydraulic pump complex 102 may include one or more pumps 104, one or more accumulators 106, one or more reservoirs 108, and two or more pressure rails 110. In operation, the hydraulic pump complex 102 may provide a source of pressurized hydraulic fluid including pressure rails at respective pressures. For instance, the hydraulic pump complex 102 may provide two, three, four, or five pressure rails. Additional pressure rails may be included to provide greater granularity of available pressure levels, but providing additional pressure rails at different pressures may increase system complexity and mass.

The one or more pumps 104 may support pressurizing hydraulic fluid to a particular pressure (e.g., 3000 PSI). A motor, such as fuel-power internal combustion engine, may drive the one or more pumps 104. Alternatively, a battery-powered electric motor may drive the one or more pumps 104, because, in some cases, such a motor may provide greater flexibility in speed range and/or reduce system complexity, among other possible benefits. A control system may vary the speed of the motor, thereby varying the speed of the one or more pumps 104, which results in increased or decreased pressure of the pumped hydraulic fluid.

The hydraulic pump complex 102 may include a multi-pressure valve (not shown) connected between the one or more pumps 104 (e.g., a fixed displacement pump that provides a constant pressure) and the two or more pressure rails 110. Each pressure rail (e.g., a tube or pipe) of the two or more pressure rails 110 may connect to a respective one of the one or more accumulators 106. In operation, a control system may cause the multi-pressure valve to selectively connect the one or more pumps 104 to each of the two or more pressure rails 110 for a period of time (e.g., 100 milliseconds). While a pressure rail is connected to the pump, pressurized hydraulic fluid may flow from the pump to the pressure rail. Some pressurized hydraulic fluid may be stored in the respective accumulator for the pressure rail. The multi-pressure valve may vary the pressure of the pressure rail by varying how often the fixed displacement pump is connected to the pressure rail. More frequent connections from the fixed displacement pump to the pressure rail result in a higher pressure at the pressure rail, as more pressurized fluid flows to the pressure rail. Conversely, less frequent connections from the fixed displacement pump to the pressure rail result in a lower pressure at the pressure rail. For instance, every 1.5 seconds, the multi-pressure valve may connect a first pressure rail for 800 ms, a second pressure rail for 400 ms, a third pressure rail for 200 ms, and a fourth pressure rail for 100 ms.

As noted above, the multi-pressure valve may vary the pressure of the pressure rail by varying how often one or more pumps 104 are connected to the pressure rail. As pressurized hydraulic fluid flows from the pressure rails to other components of the hydraulic drive system, the control system may maintain the pressure rails at different pressures by adjusting how frequently the one or more pumps 104 are connected to any pressure rail. The respective accumulator for the pressure rail may maintain the pressure of the pressure rail while the pump is servicing other pressure rails.

For instance, respective pressure sensors on the pressure rails may indicate the pressure of each pressure rail. Based on data from a pressure sensor, the control system may detect that the pressure of one of the pressure rails is lower than the nominal pressure of the pressure rail (e.g., that a 3000 PSI pressure rail has dropped to 2950 PSI). In response, the control system may connect the one or more pumps 104 to the pressure rail more often or for a longer duty cycle, which may in turn maintain the pressure of the pressure rail and/or replenish pressurized hydraulic fluid in the accumulator. In some cases, such as when the respective accumulators have reached nominal (desired) pressure levels, the multi-pressure valve may connect the pump to the one or more reservoirs 108, one of which may be a return reservoir (i.e., a store of hydraulic fluid for the one or more pumps 104). In this manner, the hydraulic pump complex 102 may provide pressurized hydraulic fluid at or approximately at respective pressures.

The switch valve complex 112 may include multiple inputs 114, one or more switches 116, and one or more outputs 118. The one or more inputs 114 may connect to respective pressure rails 110 of the hydraulic pump complex 102. In some implementations, a control system may cause the one or more switches 116 to selectively connect one of the one or inputs 114 to a single output of the one or more outputs 118, thereby allowing pressurized hydraulic fluid to flow from the connected pressure rail to the single output, which may then in turn connect to another component of the hydraulic drive system 100. In some cases, the inputs and outputs may reverse operation and become outputs and inputs, respectively. In this configuration, one or more hydraulic actuators connected to the input (previously the output) may push pressurized hydraulic fluid back through the switch valve complex 112 to the respective pressure rails 110, which may result in regenerating some energy. Fluid from the actuators may also be pushed back to a return line, which may cause the actuator to coast or to act as a brake when the actuator is doing negative work. In other implementations, the one or more switches 116 may selectively connect two or more of the multiple inputs 114 to respective outputs of the one or more outputs 118. Such an arrangement may facilitate connecting pressure rails at different pressures to different outputs, which may in turn connect to different hydraulic actuators.

The metering valve 120 includes at least one input 122, at least one throttle 124, and at least one output 126. In operation, the at least one throttle 124 may restrict the flow of hydraulic fluid flowing from the at least one input 122 to the at least one output 126. Such restriction may lower the pressure of the hydraulic fluid. The at least one throttle 124 may be adjustable, such that it may throttle hydraulic fluid flowing from the at least one input 122 to the at least one output 126 by a varying degree. A control system may connect to the at least one throttle 124 and adjust the at least one throttle 124. In some cases, the control system may open the at least one throttle 124 such that the pressure of hydraulic fluid flowing through the at least one throttle 124 is not substantially lowered. In some implementations, the at least one throttle 124 may be an electrically operated valve, such as an electrohydraulic servovalve. In other examples, the metering valve 120 may include a directional valve by which the actuator may provide bi-directional force or torque on a robotic joint. The control system may connect to such an electrically operated valve and cause the valve to open or close to various positions.

Some implementations of the switch valve complex may include the metering valve. For instance, the switch valve complex may include one or more switches and one or more throttles. In such an example, a throttle may be in line of a flow of hydraulic fluid from an input to an output. Such a configuration may result in quicker hydraulic pressure adjustments, among other possible benefits.

In some implementations, a control system may operate the hydraulic drive system in either a discrete mode or a continuous mode. In the discrete mode, the control system may disable the throttle 124 and thereby supply pressure to hydraulic actuators at approximately the pressure of the selected pressure rail. In this mode, throttling losses are approximately zero as the throttle 124 is disabled (e.g., the losses may be less than 5% due to pressure drops in the hydraulic drive system and friction in the actuators and linkages). But, the control system can choose only from the discrete pressure levels. In the continuous mode, the control system enables the throttle 124. Accordingly, in the continuous mode, the control system may cause the throttle 124 to reduce the hydraulic fluid pressure to various levels, which may allow the control system to tune the hydraulic fluid pressure to a specific value or range of values. For example, the control system may determine a pressure at which to actuate a hydraulic actuator based on (i) a load on the actuator and (ii) a rate at which the actuator should operate on the load. The control system may then cause the throttle 124 to reduce the hydraulic fluid pressure to the determined actuation pressure.

FIG. 2A is a simplified block diagram illustrating hydraulic fluid interconnections between components of the example hydraulic drive system 100. Such interconnections are provided by way of example to illustrate possible interconnections between the components. As shown in FIG. 2A, pressure rails 110A, 110B, 110C, and 110D from the hydraulic pump complex 102 connect to the one or more inputs 114 on the switch valve complex 112. The switch(es) 116 of the switch valve complex 112 selectively connect one of pressure rails 110A, 110B, 110C, and 110D to the at least one input 122 of the metering valve 120. The at least one output 126 of the metering valve 120 may in turn connect to an output 128 to one or more respective ports on one or more hydraulic actuators.

FIG. 2B is a simplified block diagram illustrating alternative hydraulic fluid interconnections between components of the example hydraulic drive system 100. As shown in FIG. 2B, pressure rails 110A, 110B, 110C, and 110D from the hydraulic pump complex 102 connect to the one or more inputs 114 on the switch valve complex 112. Two outputs of the one or more outputs 118 from the switch valve complex 112 may connect to hydraulic actuators. One output of the outputs 118 from the switch valve complex 112 may connect to the at least one input 122 of the metering valve 120. The at least one output 126 of the metering valve 120 may connect to an output 128 to one or more hydraulic actuators. In this arrangement, the switch valve complex 112 can selectively connect metered or unmetered rails to the hydraulic actuators.

Figure 2C:
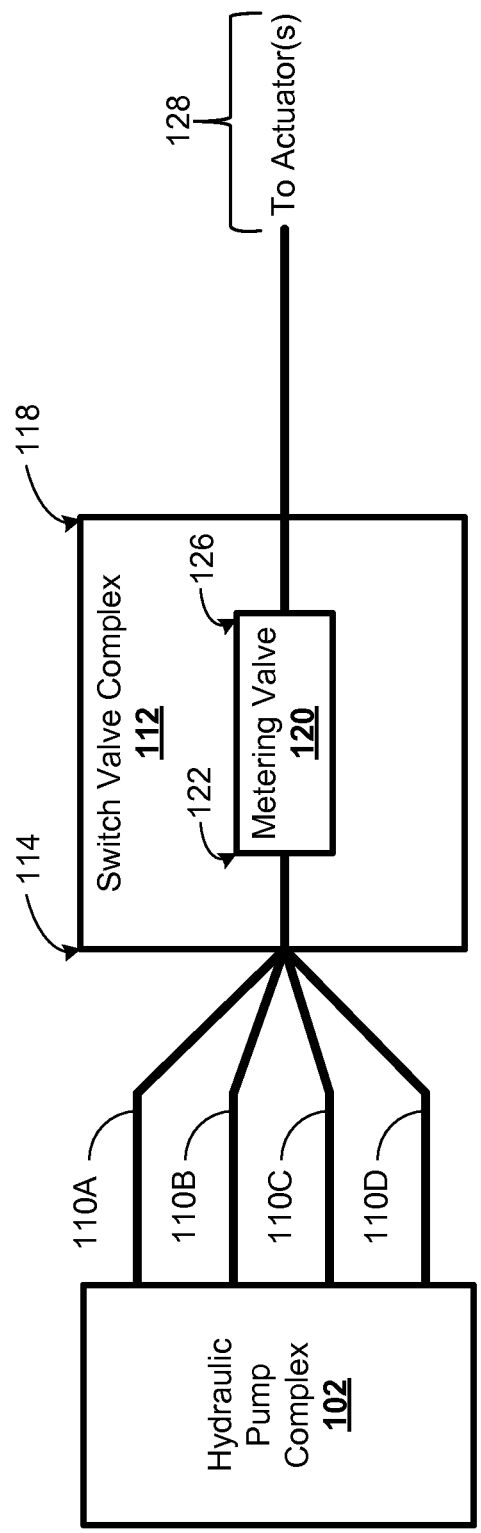
FIG. 2C is a simplified block diagram illustrating additional alternative hydraulic fluid interconnections between components of the example hydraulic drive system.

FIG. 2C is a simplified block diagram illustrating alternative hydraulic fluid interconnections between components of the example hydraulic drive system 100. As shown in FIG. 2B, pressure rails 110A, 110B, 110C, and 110D from the hydraulic pump complex 102 may connect to the one or more inputs 114 on the switch valve complex 112. Within the switch valve complex 112, a metering valve 120 may connect one of the one or more inputs 114 to one output of the outputs 118, which may in turn connect to an output 128 to one or more hydraulic actuators.

Figure 3:
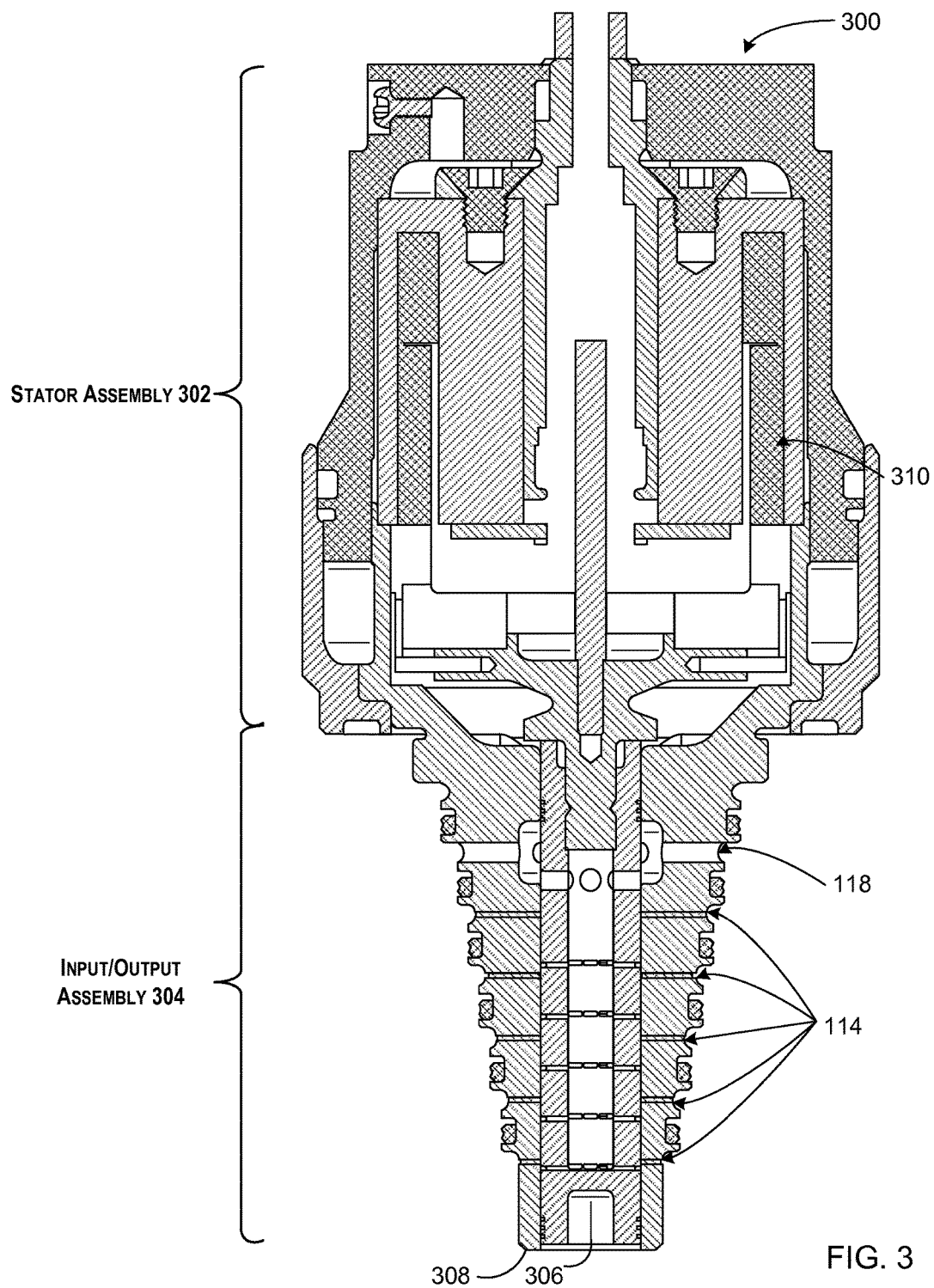
FIG. 3 illustrates an example linear switch valve.

FIG. 3 illustrates an example linear switch valve 300 that includes a stator assembly 302 and input/output assembly 304. The switch valve complex 112 may include such a linear switch valve to connect the inputs 114 to the output(s) 118. The stator assembly 302 may include a coil 310. Current through the coil may cause a spool 306 of the input/output assembly 304 to translate within a sleeve 308. Translation of the spool may connect one or more inputs to one or more outputs of the input/output assembly 304. As noted above, in some implementations, the switch valve complex 112 may include the metering valve.

Figure 4:
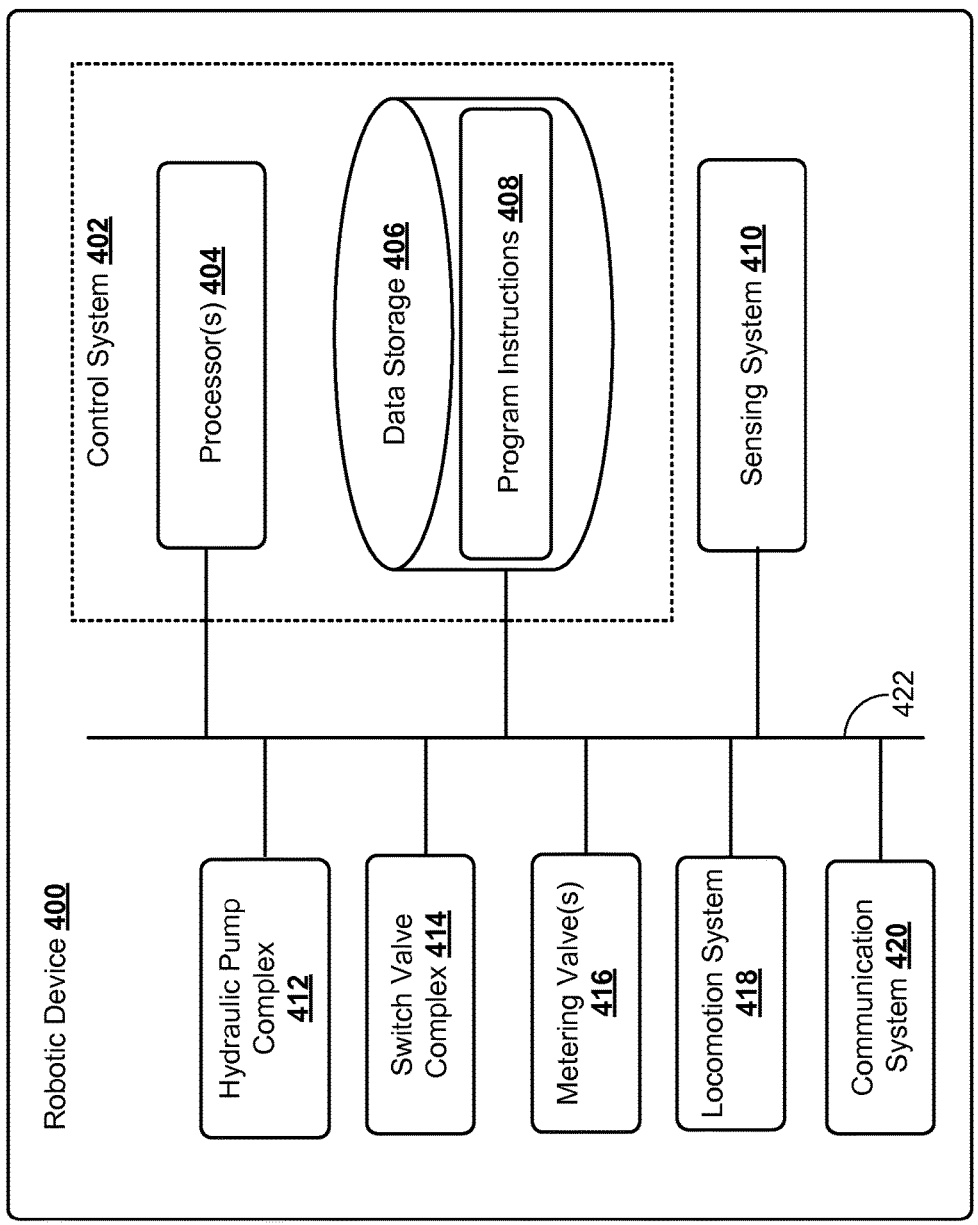
FIG. 4 is a simplified block diagram illustrating components of an example robotic device.

FIG. 4 is a simplified block diagram illustrating components of an example robotic device 400. The robotic device 400 may include a control system 402, a sensing system 410, a hydraulic pump complex 412, a switch valve complex 414, metering valve(s) 416, a locomotion system 418, and a communication system 420. One or more of these components may be interconnected by a bus or other interconnection system 422.

The control system 402 may include one or more processors 404, non-transitory data storage 406, and program instructions 408 stored on the data storage 406. The one or more processors 404 may, for example, include a single or multi-core processor, an application specific integrated circuit (ASIC), field programmable gate array (FPGA), and/or any other suitable circuitry. The program instructions 408 stored on the data storage 406 may be executable by the one or more processors 404 to perform specific functions, which may include the specific functions described herein.

The hydraulic pump complex 412, the switch valve complex 414, and the metering valves 416 may be implemented as the hydraulic pump complex 102, the switch valve complex 112, and the metering valve 120, respectively. However, variations from these examples are possible. The hydraulic pump complex 412, the switch valve complex 414, and the metering valves 416 may function alone or in combination to provide pressurized hydraulic fluid to the locomotion system 418. For instance, the functions of switching and metering can be combined, as with linear switch valve 300.

The locomotion system 418 may include one or more limbs (e.g., one or more legs and/or one or more arms). In some implementations, the robotic device may be a biped (i.e., a two-legged robot). In other implementations, the robotic device may be a quadruped (i.e., a four-legged robot). In yet further implementations, the robotic device may have three legs or six legs. Many alternatives are possible.

Each leg may be divided into one or more members. The members may be rotably connected at one or more joints (e.g., "ankle," "knee," and/or "thigh" joints). One or more hydraulic actuators may move the one or more members in relation to one another, causing the robotic device to walk or run.

Figure 5A:
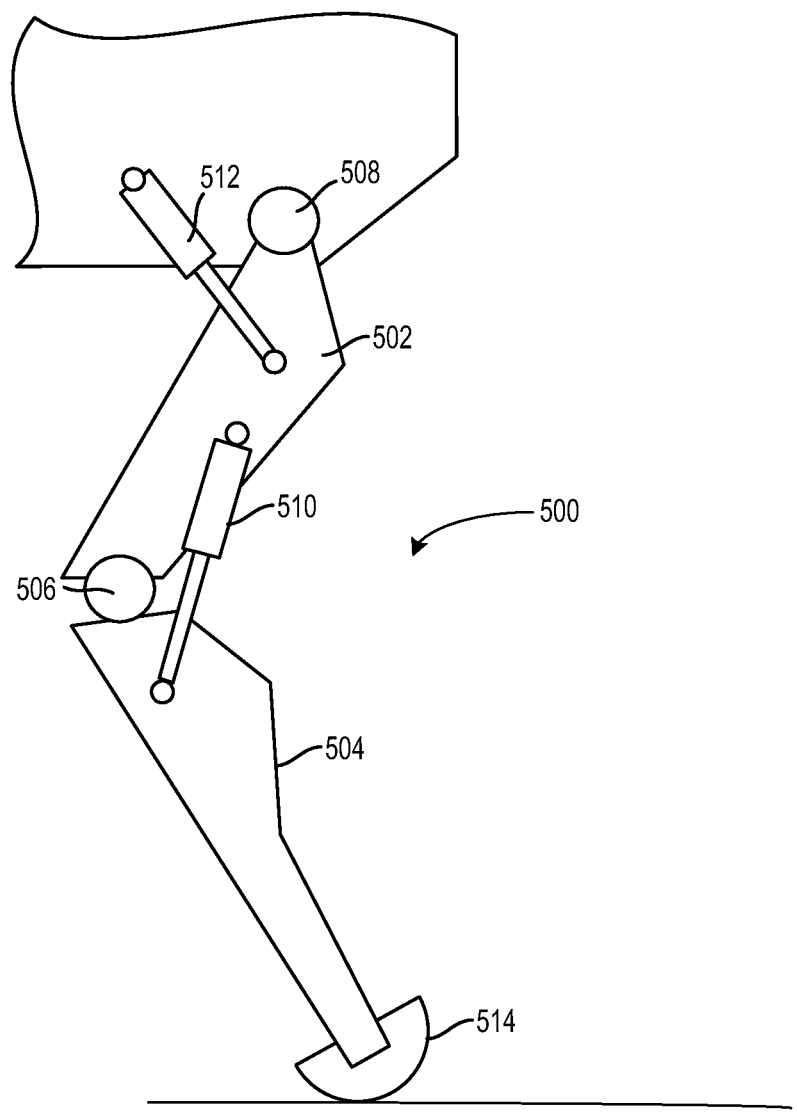
FIG. 5A is a side-view of an example robotic leg in a first arrangement.

FIG. 5A is a side-view of an example articulable robotic leg 500. The robotic leg includes a member 502 having a first end that is connected to the robotic device at joint 508. The member 502 has a second end that is rotably connected to a first end of a member 504 at joint 506. The member 504 has a second end that is connected to a foot member 514. The example robotic leg 500 also includes a linear hydraulic actuator 512 connected between the member 504 and the robotic device. Actuation of the linear hydraulic actuator 512 causes the member 502 and the member 504 to rotate around joint 508. Similarly, actuation of the linear hydraulic actuator 510 causes the member 504 to rotate around the joint 506.

Figure 5B:
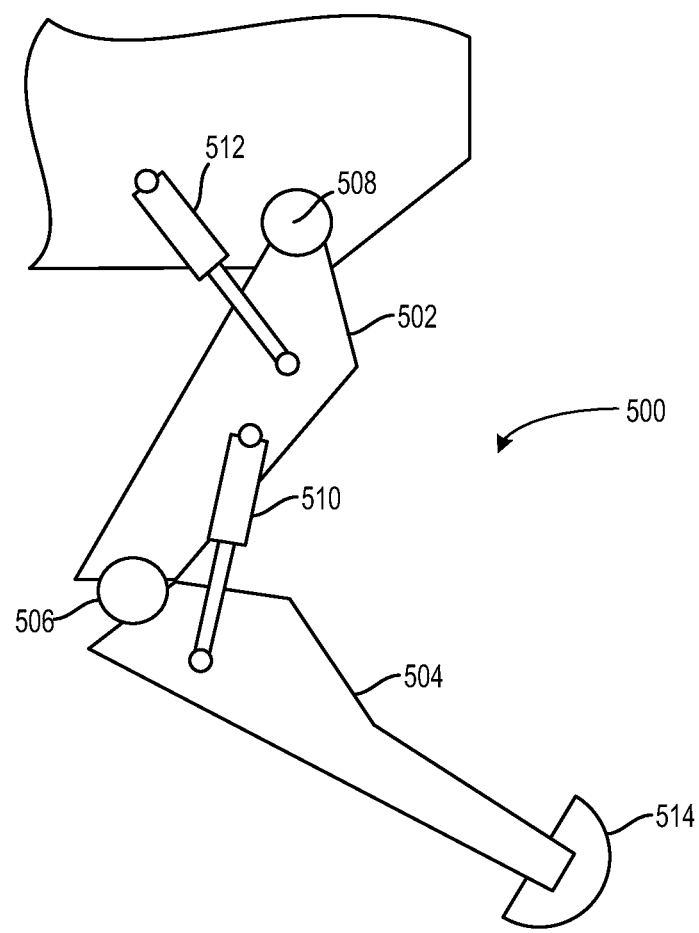
FIG. 5B is a side-view of the example robotic leg in a second arrangement.

Actuating the linear hydraulic actuator 510 and the linear hydraulic actuator 512 in combination may cause the leg to take a step. For instance, linear hydraulic actuator 510 may retract, which causes member 504 to rotate counter-clockwise around joint 506. This rotation may raise the leg 500 up from the ground, as shown in FIG. 5B. Linear hydraulic actuator 512 may then retract, which causes member 502 to rotate clockwise around joint 508. By rotating member 502 clockwise around joint 508, foot member 514 moves forward relative to the ground. Linear hydraulic actuators 510 and 512 may then extend and thereby cause leg 500 to lower and push against the ground, thereby causing the robotic device to move forward.

The locomotion system 418 may move the robotic device 400 according to a gait. The gait is a pattern of movement of the legs of the robotic device. The pattern of movement may involve a cyclical sequence of actuations by the hydraulic actuators. During a cycle of the gait, each leg may perform a stepping sequence, such as the stepping sequence described above. For instance, a bipedal robot may step a right leg and then a left leg during one cycle of a gait. Alternatively, the bipedal robot may move the right leg and the left leg at the same time, perhaps in a relatively faster gait.

The robotic device may alternate between several different gaits. For instance, a bipedal robot may alternate between a walking gait and a running gait. A quadruped robot may alternate between a walk, a run, and a gallop, among other possible gaits. The robotic device may move according to different gaits by varying the timing of actuation, speed of actuation, and range of actuation of the hydraulic actuators. The particular gaits that a particular robotic device is capable of performing may depend upon the range of motion of its legs and the force and velocity specifications of the hydraulic actuators. The range of motion of its legs may in turn depend upon the leg length and range of travel of the linear actuators. Acceleration of the actuators is proportional to the pressure of the hydraulic fluid used to actuate the hydraulic actuator—with a given load, higher pressure results in greater acceleration. The control system may select a particular gait based on factors such as speed, terrain, the need to maneuver, and/or energy efficiency. For instance, the robotic device may transition from a walk to a run as speed of locomotion is increased. The robotic device may then transition back to a walk on uneven terrain.

Load on the hydraulic actuators may vary during the stepping sequence. During the portion of the gait in which the hydraulic actuators are causing a leg to push against the ground, the load on the hydraulic actuators is relatively large compared to the portion of the gait in which the hydraulic actuators are raising the leg and stepping forward. As the load varies, the robotic device may vary the pressure supplied by the hydraulic drive system to maintain the movement of the legs according to the gait.

Figure 6:
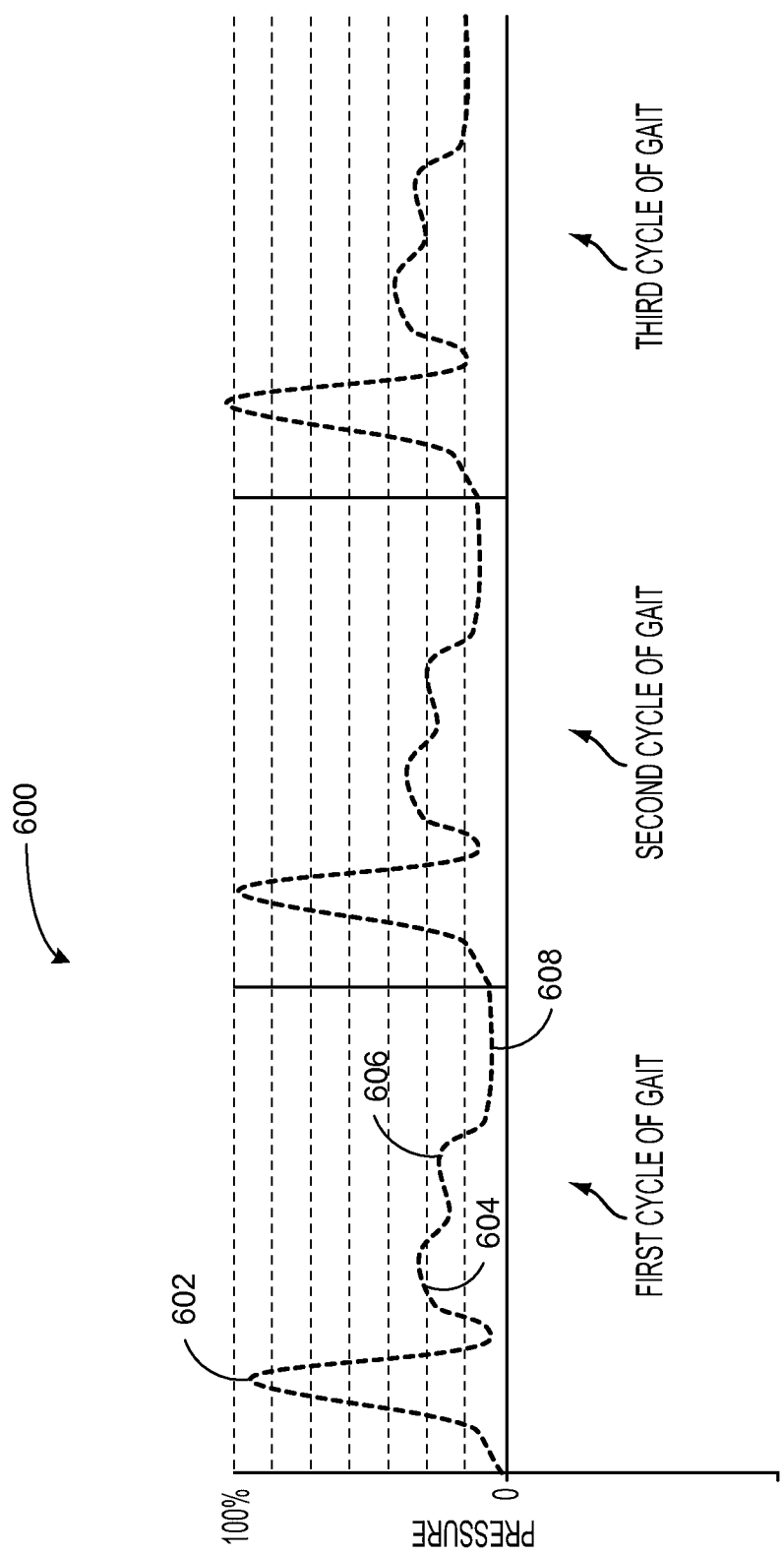
FIG. 6 is a chart illustrating energy usage by an example legged robotic device while walking according to a gait.

FIG. 6 shows a plot 600 representing combined pressure at hydraulic actuators of a given leg of a robotic device during three cycles of a gait. The x-axis of the plot is time and the y-axis is relative pressure. Point 602 on the plot 600 represents the pressure at the hydraulic actuators during the portion of the gait in which the hydraulic actuators are causing a leg to push against the ground. Point 604 represents the pressure at the hydraulic actuators during the portion of the gait in which the hydraulic actuators are picking up the leg. Point 606 represents the pressure at the hydraulic actuators during the portion of the gait in which the hydraulic actuators are stepping the leg forward. And point 608 represents the pressure at the hydraulic actuators during the portion of the gait in which the hydraulic actuators are lowering the leg to the ground. These pressures repeat over time as the pattern of movements of the gait are repeated. In some cases, such as when the terrain that the robotic device is traversing changes, the average pressure may change between cycles, as shown.

Returning to FIG. 4, the sensing system 410 may include sensors arranged to sense aspects of the robotic device 400 and the environment in which the robotic device 400 is operating. The sensing system 410 may connect to the control system 402 and thereby provide the control system 402 with data from the sensors. The control system 402 may track and store this sensor data and make operational determinations based on the tracked sensor data.

As noted above, the sensing system may include sensors arranged to sense aspects of the robotic device. The sensing system 410 may include one or more force sensors arranged to measure load on various components of the robotic device. In one example, the sensing system may include one or more force sensors on each leg. Such force sensors on the legs may measure the load on the hydraulic actuators that actuate the members of the leg.

The sensing system 410 may include one or more pressure sensors. One or more pressure sensors may measure the pressure of the hydraulic fluid at the hydraulic actuators. In some implementations, the sensing system 410 may include a pressure sensor on each pressure rail.

The sensing system 410 may include one or more position sensors. Position sensors may sense the position of the hydraulic actuators of the robotic device. Position sensors may also sense the positions of the hydraulic actuators. In one implementation, position sensors may sense the extension or retraction of the hydraulic actuators on the legs of the robotic device.

The sensing system 410 may include one or more position, velocity, or acceleration sensors. For instance, the sensing system 410 may include an inertial measurement unit (IMU). The inertial measurement unit may sense the robotic device's velocity, orientation, and acceleration. The sensing system may include one or more global positioning system (GPS) devices. The GPS may sense the robotic devices absolute positions. The control system may use GPS data to determine the robotic device's speed or direction, possibly in combination with data from the IMU.

The sensing system 410 may include one or more perception sensors arranged to sense the environment in which the robotic device 400 is operating. One or more of the perception sensors may be mounted on the robotic device 400 and oriented in the direction of locomotion. Such sensors may sense physical features of the environment, such as the terrain, vegetation, man-made objects and structures, and the like. In some implementations, the perception sensors may include one or more lidar systems. Such lidar systems may generate data indicating a map or model of the physical features of the environment, which may then be used by the control system to navigate the robotic device, perhaps in combination with sensor data from the other sensors. In some implementations, the perception sensors may include one or more cameras, such as one or more stereo cameras. For example, one or more stereo cameras may generate three-dimensional images of the physical features of the environment. The control system may evaluate the three-dimensional images to identify the physical features and their position relative to the robotic device. The perception sensors may also include one or more range finders, such as one or more laser range finders, which may generate data indicating distances from the robotic device to the physical features of the environment. The sensing system 410 may include other types of perception sensors as well.

The communication system 420 may include one or more wired or wireless communication interfaces that operate according to one or more communications protocols to facilitate data communications between the robotic device and other devices. For example, the communication system 420 may include a Wi-Fi communication component that is configured to facilitate wireless data communication according to one or more IEEE 802.11 protocols. Alternatively, the communication system 420 may include a cellular radio communication component that is configured to facilitate wireless communication (voice and/or data) with a cellular wireless base station to provide mobile connectivity to a network. Many other communication interfaces are known and available and the robotic device may include any suitable communication interface.

Figure 7:
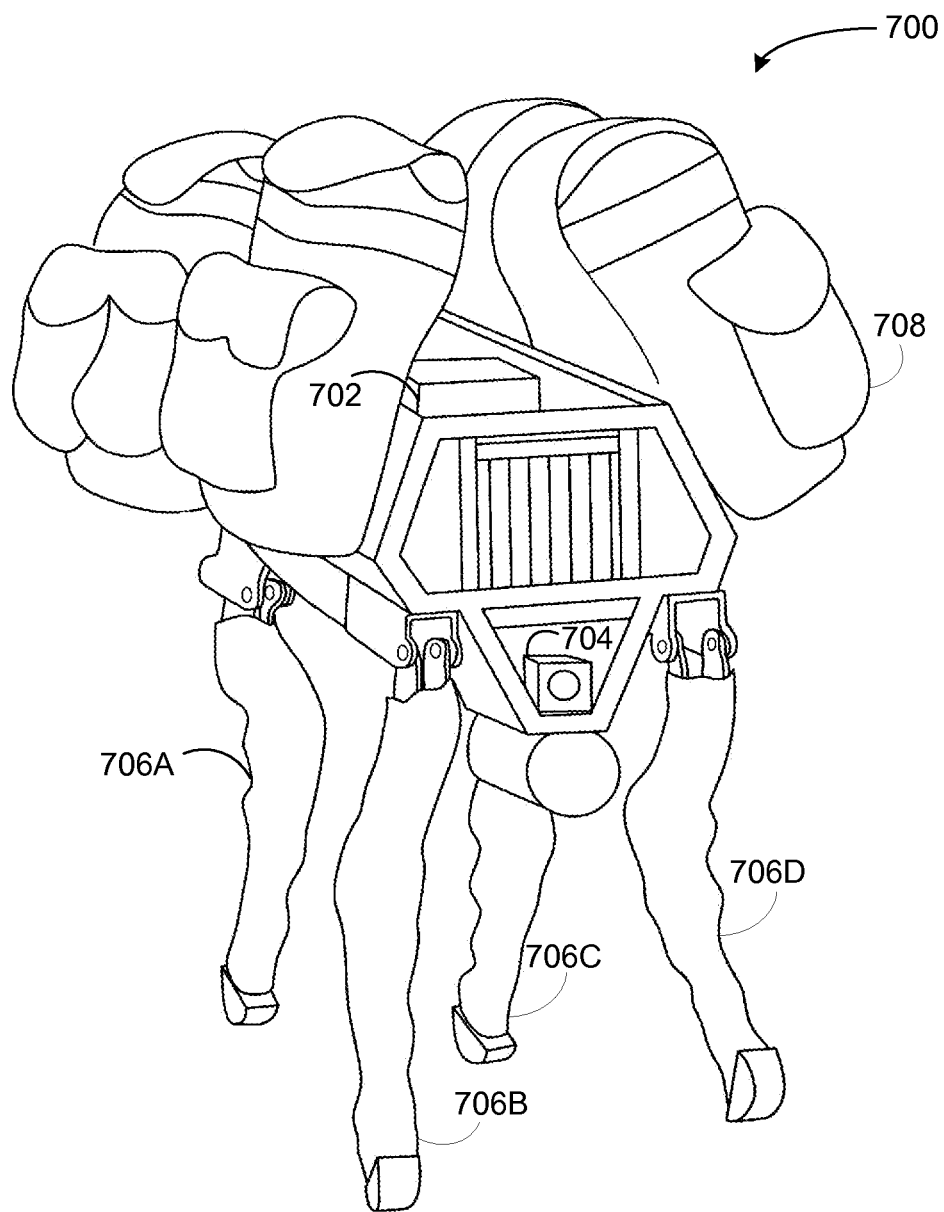
FIG. 7 is a perspective view of an example legged robotic device.

FIG. 7 is a perspective view of an example legged robotic device 700. Robotic device 700 includes a control system 702, a hydraulic drive system (not shown), a locomotion system that includes legs 706A, 706B, 706C, and 706D, and a sensing system, of which perception sensor 704 is shown. Robotic device 700 is carrying a load 708.

Control system 702 of robotic device 700 may cause the robotic device 700 to navigate an environment based on sensor data from the sensing system. The sensing system may include sensors of sensing system 410 (e.g., perception sensor 704). The robotic device 700 may receive navigation commands by way of the communication system 420. For instance, the robotic device may receive a command to move forward at 5 kilometers per hour. The command may specify to walk forward for a particular distance, such as 100 meters.

In some examples, the navigation commands may involve GPS coordinates. In one instance, a command may instruct the robotic device to navigate to a particular position, which may be defined by particular GPS coordinates. The robotic device may then cause the locomotion system to move to the position while navigating physical features of the terrain identified by the control system (perhaps based on data from the perception sensors). Another command may instruct the robotic device to follow a particular person, who may have with them a GPS enabled device that generates data indicating the position of the person. The data may be communicated to the robotic device which may then cause the locomotion system to follow the person while navigating physical features of the terrain identified by the control system.

Figure 8:
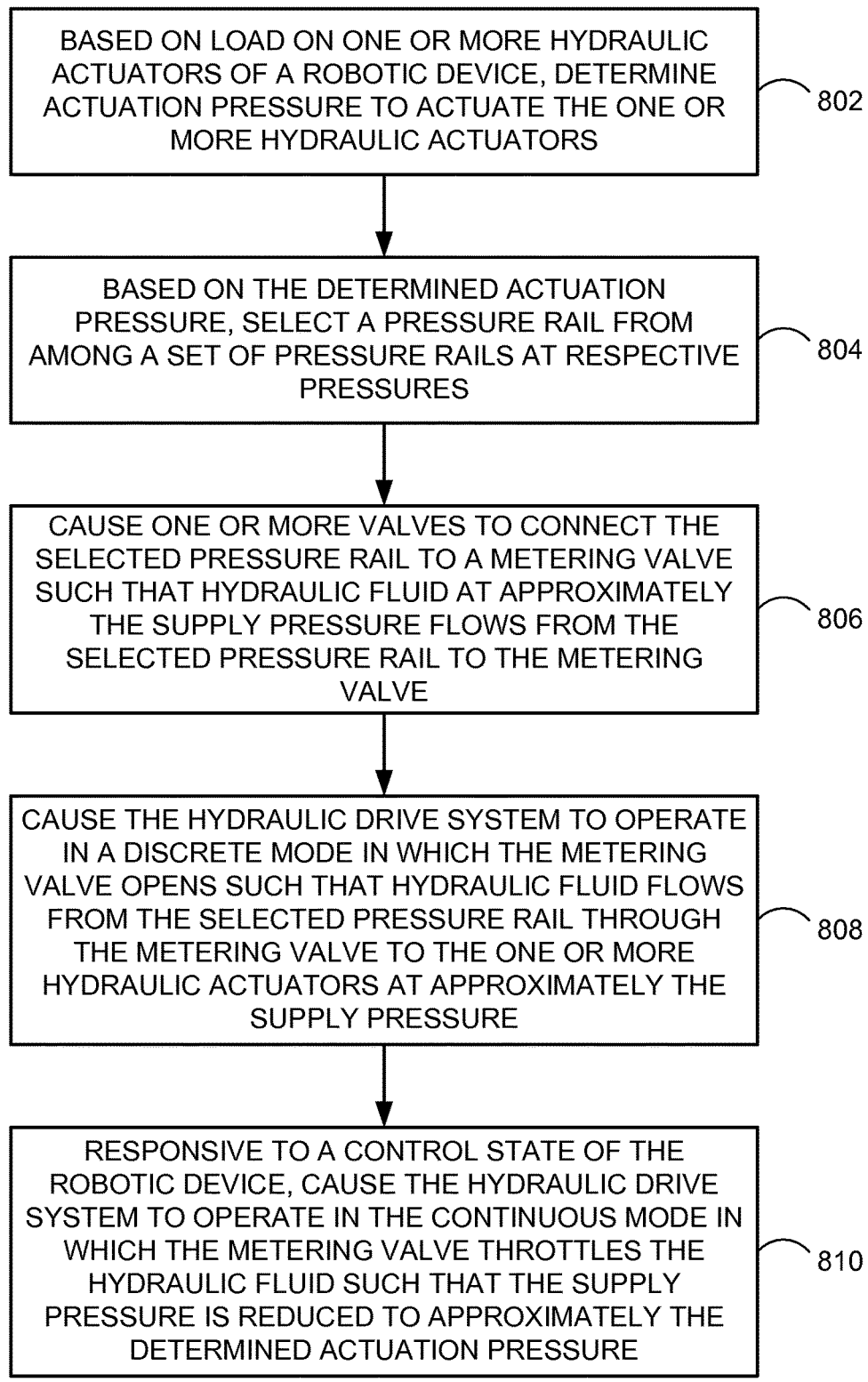
FIG. 8 is a flowchart illustrating an example method for facilitating the operation of a hydraulic drive system in a discrete mode and a continuous mode.

FIG. 8 is a flowchart illustrating example operation of a hydraulic drive system in a discrete mode and a continuous mode. These operations, for example, could be used with the hydraulic drive system 100 in FIG. 1, the robotic device 400 in FIG. 4, and/or the robotic device 700 in FIG. 7, for example, or may be performed by a combination of any components of the hydraulic drive system 100 in FIG. 1, the robotic device 400 in FIG. 4, or the robotic device 700 in FIG. 7. FIG. 8 may include one or more operations, functions, or actions as illustrated by one or more of blocks 802-810. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for FIG. 8 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include a non-transitory computer-readable medium, for example, such as computer-readable media that stores data for short periods of time like register memory, processor cache and random access memory (RAM). The computer-readable medium may also include other non-transitory media, such as secondary or persistent long term storage, like read only memory (ROM), optical or magnetic disks, compact-disc read only memory (CD-ROM), for example. The computer-readable media may also be any other volatile or non-volatile storage system. The computer-readable medium may be considered a computer-readable storage medium, a tangible storage device, or other article of manufacture, for example. The program code (or data for the code) may also be stored or provided on other media including communication media. For instance, the commands may be received on a wireless communication media, for example.

In addition, for FIG. 8 and other processes and methods disclosed herein, each block may represent circuitry that is arranged to perform the specific logical functions in the process.

Functions of FIG. 8 may be fully performed by a control system, or may be distributed across multiple control systems. In some examples, the control system may receive information from sensors of a robotic device, or the control system may receive the information from a processor that collects the information. The control system could further communicate with a remote control system (e.g., a control system on another robotic device) to receive information from sensors of other devices, for example.

At block 802, an actuation pressure to actuate the one or more hydraulic actuators is determined. Actuation pressure may be proportional to the load on the hydraulic actuator and the acceleration of the hydraulic actuator (i.e., the rate of actuation). Actuation pressure is inversely proportional to the area or size of the actuator. The following formulas are illustrative: cause the increased walking speed. Likewise, a running gait may involve greater acceleration of the hydraulic actuators than the walking gait.

The control system may maintain or have access to data that defines the series of actuations that create a gait. The data may define different series of actuations for different gaits, such as a walking gait or a running gait. For a given gait, the control system may scale the series of actuations to the desired speed—a higher speed requires quicker actuations (i.e., greater acceleration of the actuator).

In some cases, the load on the actuator or the desired rate of actuation may be different among two or more actuators involved in actuating the load. For instance, a gait may involve actuating hydraulic actuators 610 and 612 of robotic leg 600 in FIG. 6A at different rates. In such a case, the hydraulic drive system may supply pressurized hydraulic fluid at a first pressure to hydraulic actuator 610 and pressurized hydraulic fluid at a second pressure to hydraulic actuator 612. In some cases, the one or more hydraulic actuators may be divided into two or more groups (e.g., a first group and a second group) that may experience similar load and move at a similar rates. For instance, a "thigh" actuator (e.g., actuator 612) on each leg may be designed into the first group and a "shin" actuator (e.g., actuator 610) on each leg may be designated into the second group. The hydraulic drive system may then supply pressurized hydraulic fluid at one pressure to the first group and pressurized hydraulic fluid at another pressure to the second group.

At block 804, a pressure rail may be selected from among a set of pressure rails at respective pressures. In one case, the control system may cause one or more valves to select one of a first pressure rail at a first pressure or a second pressure rail at a second pressure. As noted above, in operation, the hydraulic drive system may supply pressurized hydraulic fluid to pressure rails at respective pressures. The second pressure may be higher than the first pressure. For instance, hydraulic drive system 100 may supply pressurized hydraulic fluid to pressure rails 110A and 110B at 3000 PSI and 1500 PSI respectively. In another case, hydraulic drive system 100 may supply pressurized hydraulic fluid to pressure rails 110A, 110B, 110C, and 110D at 3000 PSI, 1500 PSI, 750 PSI, and 300 PSI, respectively. The control system may then select one of the pressure rails based on the determined actuation pressure.

In some cases, the control system may select the pressure rail that is, among the respective pressures, at the lowest pressure that exceeds the determined actuation pressure. For instance, the control system may select the first pressure rail when the determined actuation pressure is less than the first pressure and the second pressure rail is selected when the determined actuation pressure exceeds the first pressure. In another example, as noted above, the hydraulic drive system may supply 3000 PSI, 1500 PSI, 750 PSI, and 300 PSI to respective pressure rails. For a determined actuation pressure of 1250 PSI, the hydraulic drive system may select the pressure rail at 1500 PSI, as 1500 PSI is the pressure rail at the lowest pressure that exceeds 1250 PSI among the pressure rails at 3000 PSI, 1500 PSI, 750 PSI, and 300 PSI.

In other cases, the control system may select the pressure rail that is, among the respective pressures, at the pressure that is closest to the determined actuation pressure. As noted above, in one example, the hydraulic drive system may supply 3000 PSI, 1500 PSI, 750 PSI, and 300 PSI to respective pressure rails. For a determined actuation pressure of 800 PSI, the hydraulic drive system may select the pressure rail at 750 PSI, as 800 PSI is the pressure rail at the closest pressure to 800 PSI among the pressure rails at 3000 PSI, 1500 PSI, 750 PSI, and 300 PSI.

However, in some cases, the pressure rail closest to the determined actuation pressure may at a pressure that is too low to actuate the load at an acceptable or desired rate. Therefore, in some implementations, the control system may further determine whether the supply pressure is less than the determined actuation pressure by more than a pre-determined threshold. For instance, for a determined actuation pressure of 2200 PSI, the hydraulic drive system may select the pressure rail at 1500 PSI, as 1500 PSI is the pressure rail at the closest pressure to 2200 PSI among the pressure rails at 3000 PSI, 1500 PSI, 750 PSI, and 300 PSI. However, 1500 PSI may actuator the hydraulic actuator too slowly, as the force caused by the pressure is low. In this case, the supply pressure (1500 PSI) may be less than the determined actuation pressure (2200 PSI) by more than a pre-determined threshold (e.g., 100 PSI). In such a case, the control system may select the pressure rail at 3000 PSI, as that pressure rail is the pressure rail at the closest pressure to 2200 PSI in which the supply pressure is not less than the determined actuation pressure by more than the pre-determined threshold.

At block 806, one or more valves may connect the selected pressure rail to a metering valve such that hydraulic fluid at approximately the supply pressure flows from the selected pressure rail to the metering valve. For instance, the control system may cause a switch valve complex, such as switch valve complex 112 in FIG. 1, to connect pressure rail 110A at 3000 PSI to the metering valve 120. Some pressure loss may result from the flow of the hydraulic fluid through various linkages and valves between the pressure rail and the metering valve. Accordingly, the hydraulic pressure may be at approximately the supply pressure (e.g., within 10% of the supply pressure).

At block 808, the hydraulic drive system may operate in a discrete mode in which the metering valve opens such that hydraulic fluid flows from the selected pressure rail through the metering valve to the one or more hydraulic actuators at approximately the supply pressure. For instance, the control system may open metering valve 120 such that metering valve 120 does not throttle hydraulic fluid passing through the metering valve. Then, hydraulic fluid flowing from the selected pressure rail (e.g., pressure rail 110A at 3000 PSI) may flow through the metering valve to the one or more hydraulic actuators at approximately the supply pressure (3000 PSI). As noted above, some pressure loss may result from the flow of the hydraulic fluid through various linkages and valves.

The control system may cause the hydraulic drive system to operate in the discrete mode while in various control states. Such control states may be tolerant of operating without granular control of the supply pressure.

For instance, the control system may cause the hydraulic drive system to operate in the discrete mode while the robotic device is moving according to particular gaits, such as a running gait or a trotting gait. The control system may maintain or have access to data indicating the present control state of the robotic device. This data may indicate the particular gait, if any, that the robotic device is presenting using to move. In one instance, based on such data, the control system may determine that the robotic device is moving according to a running gait and then responsively cause the hydraulic system to operate in the discrete mode.

In another instance, the control system may cause the hydraulic drive system to operate in the discrete mode while the robotic device is moving above a particular speed. For instance, the control system may receive sensor data from a GPS sensor or IMU indicating the position or speed of the robotic device. Alternatively, the control system may receive a command to move at a particular speed. The control system may then determine that the speed exceeds a pre-determined threshold, such as four miles per hour. Then, responsive to that determination, the control system may cause the hydraulic drive system to operate in the discrete mode.

In yet another instance, the control system may cause the hydraulic drive system to operate in the discrete mode while the robotic device is traversing even terrain. For instance, the control system may receive sensor data indicating terrain that the robotic device is traversing. Perception sensors of a sensing system, such as sensing system 410, may generate data indicating physical features of the environment. Based on the number, size, and nature of these physical features, the robotic device may determine whether the terrain that the robotic device is traversing is even or uneven. In an instance in which the control system determines that the terrain is even, the control system may cause the hydraulic drive system to operate in the discrete mode. While traversing even terrain, the robotic device may be more tolerant of mismatches between the determined actuation pressure and the supply pressure. Such tolerance may result from the load on the hydraulic actuators being more balanced while traversing even terrain than while traversing uneven terrain. Further, even terrain may result in less variance over time in the load on the hydraulic actuators.

In yet another instance, the control system may cause the hydraulic drive system to operate in the discrete mode in response to detecting that energy reserves are at or below a pre-determined threshold. As noted above, a fuel-powered internal combustion engine may drive the pump 104 of the hydraulic drive system 100. The robotic device may have a tank or other storage container that can carry a certain amount of fuel. The tank may have a fuel gauge that generates data indicating the fuel level in the tank. The control system may receive this data from the fuel gauge and detect that the fuel level has fallen below a pre-determined threshold. In response to detecting that the fuel level has fallen below a pre-determined threshold, the control system may enable the discrete mode. In this manner, the control system may conserve fuel by operating in the discrete mode while fuel levels are relatively low.

At block 810, the hydraulic drive system may operate in the continuous mode in which the metering valve throttles the hydraulic fluid such that the supply pressure is reduced to approximately the determined actuation pressure.

The control system may cause the hydraulic drive system to operate in the continuous mode while in various other control states. Such control states may be less tolerant of operating without granular control of the supply pressure. The continuous control state may result in more deliberate movements and greater balance because the metering tunes the supply pressure to more closely match the determined actuation pressure.

For instance, the control system may cause the hydraulic drive system to operate in the continuous mode while the robotic device is moving according to particular gaits, such as a walking or climbing gait. As noted above, the control system may maintain or have access to data indicating the present control state of the robotic device. This data may indicate the particular gait, if any, that the robotic device is currently using to move. Based on such data, the control system may determine that the robotic device is moving according to the walking gait and then responsively cause the hydraulic system to operate in the continuous mode.

In another instance, the control system may cause the hydraulic drive system to operate in the continuous mode while the robotic device is moving below a particular speed. For instance, the control system may receive sensor data from a GPS sensor or IMU indicating the position or speed of the robotic device. The control system may then determine that the speed is under a pre-determined threshold, such as four miles per hour. Then, responsive to that determination, the control system may cause the hydraulic drive system to operate in the continuous mode.

In yet another instance, the control system may cause the hydraulic drive system to operate in the continuous mode while the robotic device is traversing uneven terrain. As noted above, the control system may receive sensor data indicating terrain that the robotic device is traversing. Based on this data, the robotic device may determine whether the terrain that the robotic device is traversing is even or uneven. In an instance in which the control system determines that the terrain is uneven, the control system may cause the hydraulic drive system to operate in the continuous mode. While traversing uneven terrain, the robotic device may be less tolerant of mismatches between the determined actuation pressure and the supply pressure. In contrast to traversing even terrain, while traversing uneven terrain, the load on the hydraulic actuators may be less balanced as the ground underneath the respective legs may be at different levels. Further, uneven terrain may cause variance in the load on the hydraulic actuators.

In yet another instance, the control system may cause the hydraulic drive system to operate in the continuous mode based on detecting that energy reserves are at or above a pre-determined threshold. For instance, the control system may receive this data from a fuel gauge and detect that the fuel level remains at or above a pre-determined threshold. In response to detecting that the fuel level is at or above a pre-determined threshold, the control system may enable the continuous mode.

Figure 9:
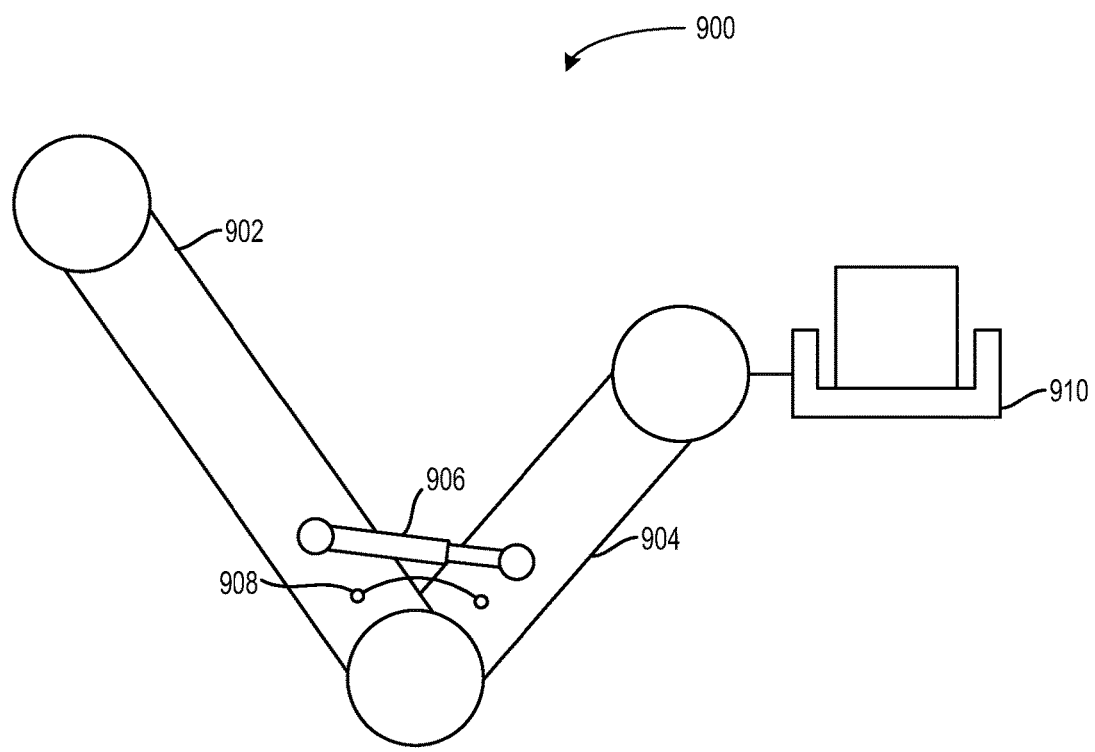
FIG. 9 is a side-view of an example robotic arm.

In some cases, the robotic device may include a robotic manipulator, such as a robotic arm. FIG. 9 is a side-view of an example articulable robotic arm 900 that includes a member 902 coupled to a member 904. A linear hydraulic actuator 906 may cause the member 904 to rotate relative to the member 904. The robotic arm 900 also includes a force sensor 908 that generates data indicating the load on the linear hydraulic actuator 906. The robotic arm 900 also includes an end effector 910 that may pick up an object.

The control system may cause the robotic device to operate in the continuous mode when the robotic manipulator is picking up an object. For instance, the control system may receive sensor data from force sensor 908. The sensor data may indicate that the load on the linear hydraulic actuator 906 has increased. Based on the sensor data, the control system may determine that end effector 910 is picking up an object. In response to that determination, the control system may cause the robotic device to operate in the continuous mode. Operating in a continuous mode while the robotic device is picking up the object may have several benefits. One possible benefit is that the continuous mode may facilitate the robotic device maintaining balance while picking up the object. Another possible benefit is that the linear hydraulic actuator 906 may move more deliberately, which may prevent damage to the object.

As noted above, in some cases, the robotic device may carry a payload. For instance, robotic device 900 in FIG. 9 may carry payload 908. The control system may receive data from force sensors that generate data indicating the magnitude of the payload. The force sensors may be distributed among the legs of the robotic device. Based on data from such sensors, the control system may determine that the robotic device is carrying an unbalanced payload. For instance, the sensor data may indicate that the load on the right leg(s) is greater than the load on the left legs. In response to determining that the robotic device is carrying an unbalanced payload, the robotic device may cause the hydraulic drive system to operate in the continuous mode. The continuous mode may facilitate the robotic device maintaining balance while carrying the unbalanced payload.

In some implementations, the control system may cause the hydraulic drive system to operate in the continuous mode or the discrete mode based on whether a pressure difference between the pressure of the selected pressure rail and the determined actuation pressure exceeds a tolerated pressure difference. The tolerated pressure difference may vary by application and/or task. For instance, during balancing tasks the tolerated pressure difference may be smaller (e.g., 0-100 PSI). During other tasks, the tolerated pressure difference may be larger (e.g., 100-500 PSI).

For example, the control system may determine that the pressure difference between the pressure of the selected pressure rail and the determined actuation pressure exceeds a tolerated pressure difference. In response to that determination, the control system may cause a metering valve, such as metering valve 120, to throttle a flow of hydraulic fluid from the selected pressure rail to the hydraulic actuator such that the hydraulic fluid is at a throttled pressure that is within the tolerated pressure difference from the determined actuation pressure. In this case, a mismatch between the determined actuation pressure and the supply pressure may exist, but the mismatch may be less than the tolerated pressure difference.

The control system may adjust the tolerated pressure difference based on the control state. For instance, the control system may adjust the tolerated pressure difference to a first pressure difference while the robotic device is in control states that call for the continuous mode, as noted above. And the control system may adjust the tolerated pressure difference to a second larger pressure difference while the robotic device is in control states that call for the discrete mode, as noted above. Then, the computing device may determine that the pressure difference between the pressure of the selected pressure rail and the determined actuation pressure is less than the second tolerated pressure difference, and, in response, cause the metering valve to open such that hydraulic fluid flowing from the selected pressure rail to the actuator is unthrottled.

As noted above, a gait of the robotic device may be cyclical. A cycle of the gait may involve causing a leg to raise from a support surface and rotate forward relative to the frame, and then causing the leg to lower to the support surface and rotate backward relative to the frame. A control system may cause multiple legs to perform these operations, perhaps offset in time from one another during the cycle of the gait. During a cycle of a gait, the control system may adjust the tolerated pressure difference. For instance, after causing the at least one leg to raise from the support surface and rotate forward relative to the frame, the control system may adjust the tolerated pressure difference to a smaller tolerated pressure difference. Then, the control system may cause the at least one leg to lower to the support surface and rotate backward relative to the frame. Adjusting the tolerated pressure difference to a smaller tolerated pressure difference before causing the at least one leg to lower to the support surface may result in more precisely positioning a "foot" of the leg on the support surface. In some circumstances, this may improve stability of the robotic device.

The control system may adjust the tolerated pressure difference based on other conditions. For instance, the control system may receive sensor data, such as data from one or more of the force sensors on a leg of the robot device, which indicates that the leg is slipping. Such data may include fluctuations in load, such as may result from the leg slipping. Based on such received data, the control system may determine that the at least one leg is slipping at a rate greater than a pre-determined threshold rate. Some amount of slipping may be acceptable, and may be more common in certain types of terrain, such as wet or snowy terrain. Too much slipping may cause the control system to adjust the threshold to a smaller tolerated pressure difference. For instance, the control system may determine that the leg slipped more than four times during the last ten gait cycles. In another instance, the control system may determine that the leg slipped during more than 20% of the gait cycles over the past kilometer of travel. Many types of similar conditions and determinations are possible as well. Based on such a determination, the control device may adjust the tolerated pressure difference to the smaller tolerated pressure difference.

Figure 10A:
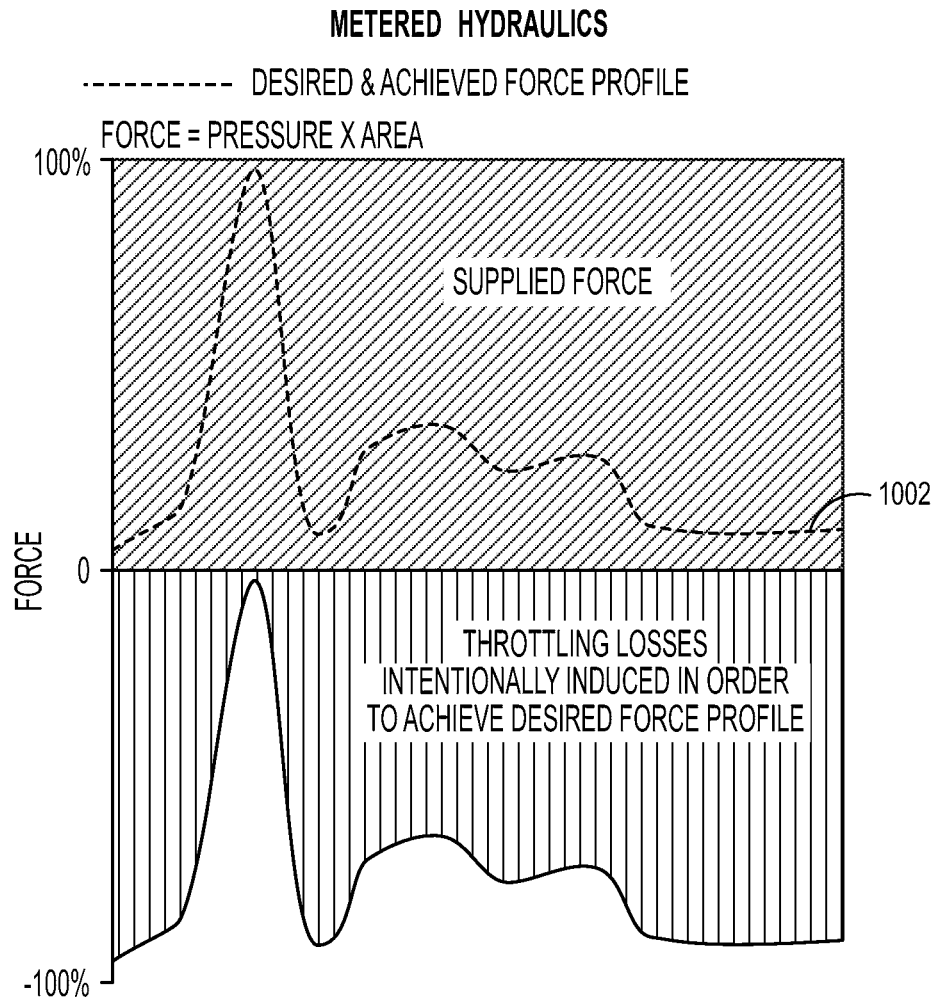
FIG. 10A is a chart illustrating energy usage in a metered hydraulic drive system.

As noted above, in some circumstances, a hydraulic drive system with discrete pressure levels may use less energy than some conventional hydraulic systems that implement metering. FIG. 10A is a chart illustrating energy usage in a conventional hydraulic drive system. The y-axis indicates relative force and the x-axis indicates time. The plot 1002 indicates a desired and achieved force profile. Such a force profile may represent aggregate determined actuation pressures. A metering valve may throttle pressurized hydraulic fluid to the match the force profile. Such throttled hydraulic fluid may cause a hydraulic actuator to actuate in a particular way. The diagonally-hatched area indicates energy consumed by the hydraulic system. As shown, the energy consumption is at a constant 100% consumption over time. The vertically-hatched area indicates throttling losses induced in order to achieve the desired force profile. As shown, the throttling losses are equivalent to the supplied force less the energy consumed in actuating the actuator according to the force profile. In this case, the throttling losses are larger than the force needed to actuate the actuator. Therefore, such a hydraulic system can be wasteful.

Figure 10B:
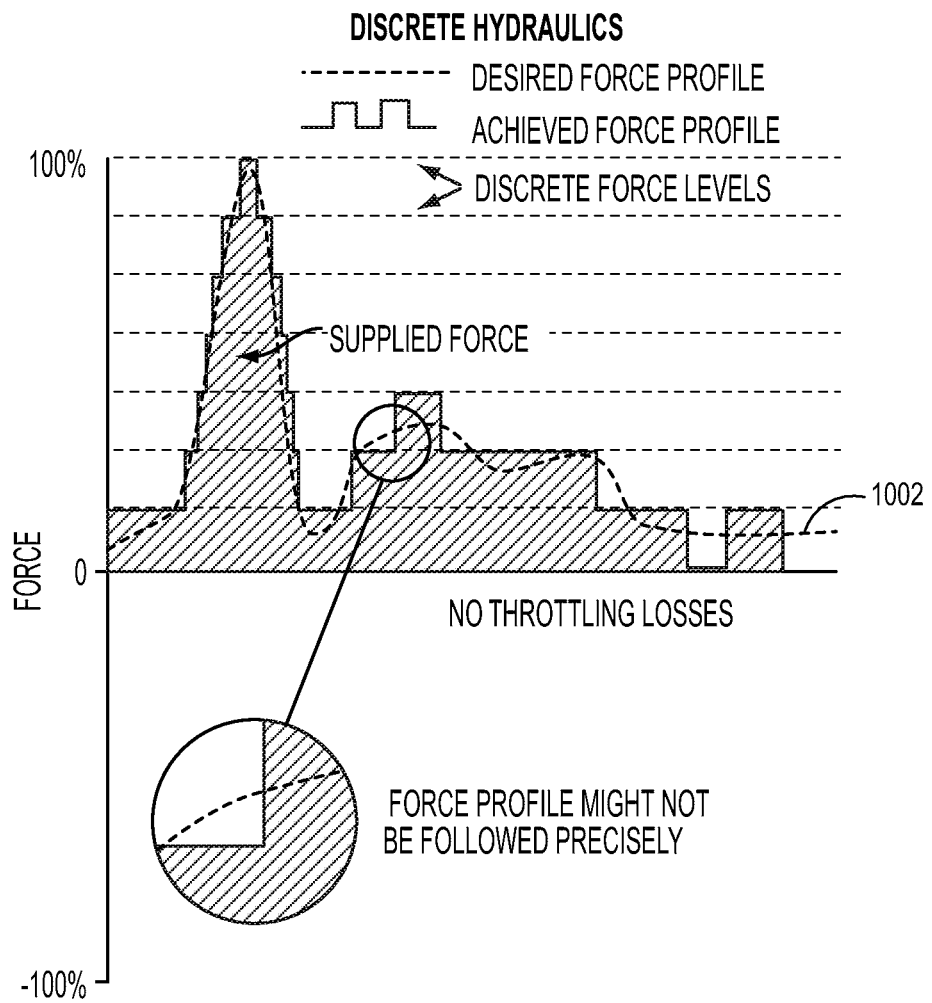
FIG. 10B is a chart illustrating energy usage in a discrete hydraulic drive system.

FIG. 10B is a chart illustrating energy usage in a discrete hydraulic drive system having eight discrete pressure levels. The y-axis indicates relative force and the x-axis indicates time. The plot 1002 indicates a desired force profile. As shown, the hydraulic drive system changes pressure level to approximately follow the force profile. However, the control system might not cause the hydraulic drive system to follow the force profile precisely, as the control system can only select from the discrete force levels. However, under this approach, the energy consumption is not at a constant 100% consumption over time. Rather, as shown, the energy consumption varies according to the discrete pressure levels chosen to approximately follow the force profile. Further, because the hydraulic drive system does not throttle, no throttling losses are produced. Therefore, there is a tradeoff—no throttling losses are produced, but pressures are not always what is desired.

Figure 10C:
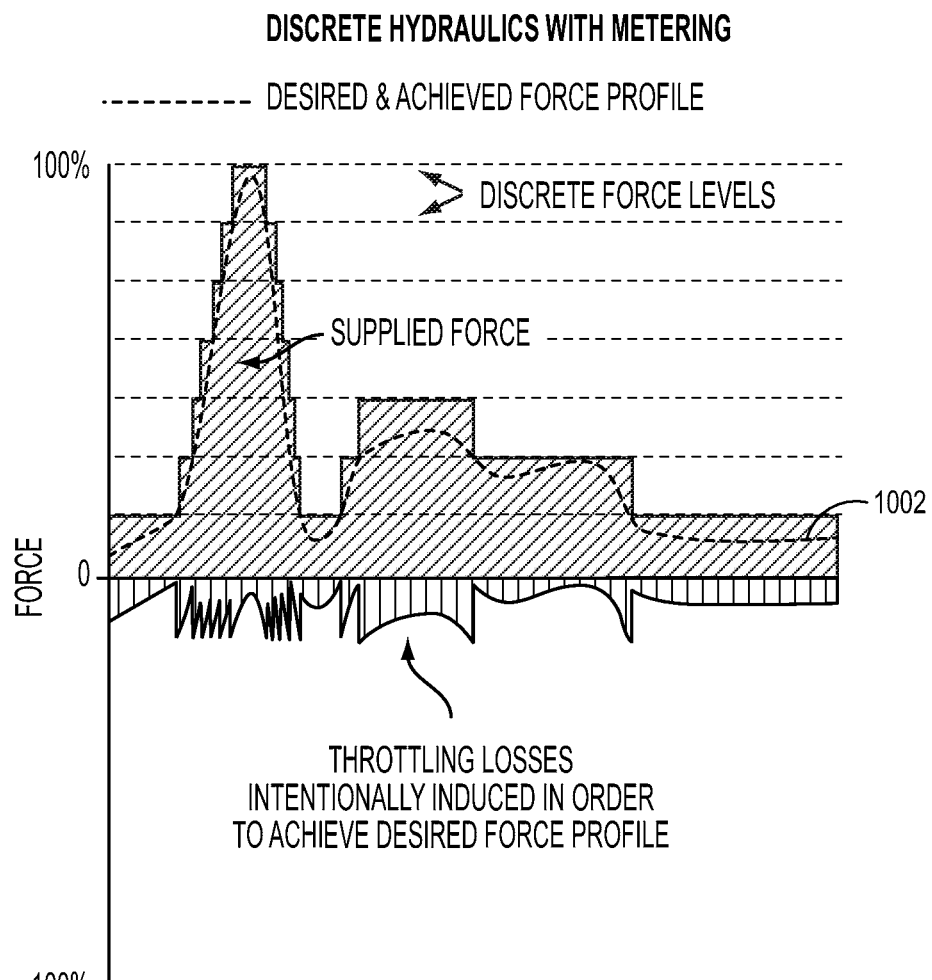
FIG. 10C is a chart illustrating energy usage in a discrete hydraulic drive system with metering.

FIG. 10C is a chart illustrating energy usage in a discrete hydraulic drive system with metering. The y-axis indicates relative force and the x-axis indicates time. The plot 1002 indicates a desired and achieved force profile. As shown, the hydraulic drive system changes pressure level to follow the force profile. But, unlike the discrete hydraulic drive system without metering, the control system can cause the hydraulic drive system to meter the supplied pressure to and thereby follow the force profile precisely. While this hydraulic drive system produces some throttling losses, the throttling losses are much less than the throttling losses produced by a conventional hydraulic system, as shown in FIG. 10A. Therefore, the advantage with a discrete hydraulic drive system with metering is that the hydraulic drive system can tune hydraulic fluid pressure to desired force while at the same time incurring smaller throttling losses compared to a metered hydraulic system.

Figure 11:
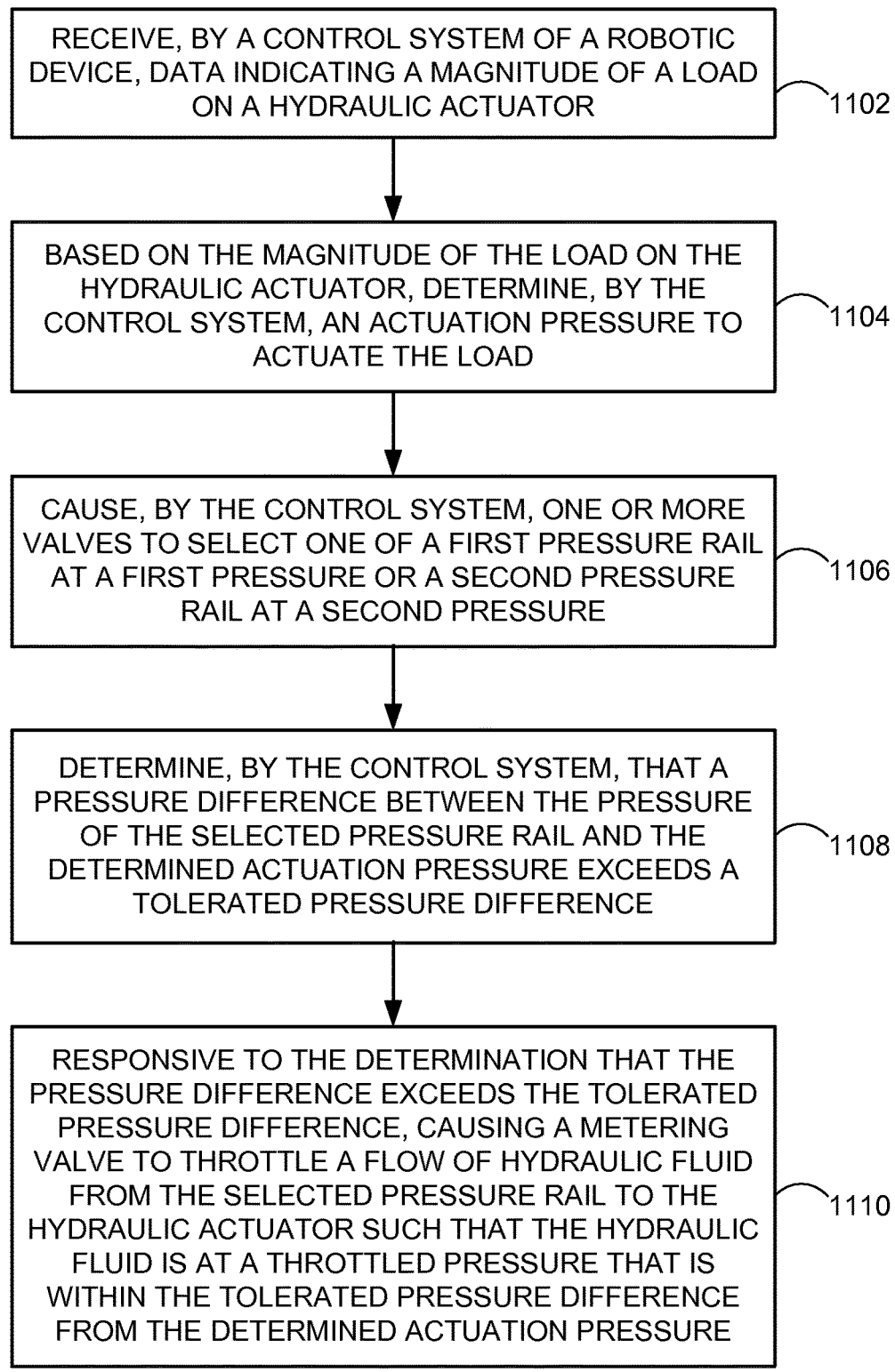
FIG. 11 is a flowchart illustrating an example method for facilitating the operation of a hydraulic drive system to selectively meter discrete pressure rails.

FIG. 11 is a flowchart illustrating example operation of a hydraulic drive system in a discrete mode and a continuous mode. These operations, for example, could be used with the hydraulic drive system 100 in FIG. 1, the robotic device 400 in FIG. 4, and/or the robotic device 700 in FIG. 7, for example, or may be performed by a combination of any components of the hydraulic drive system 100 in FIG. 1, the robotic device 400 in FIG. 4, or the robotic device 700 in FIG. 7. FIG. 11 may include one or more operations, functions, or actions as illustrated by one or more of blocks 1102-1110. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for FIG. 11 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include a non-transitory computer-readable medium, for example, such as computer-readable media that stores data for short periods of time like register memory, processor cache and random access memory (RAM). The computer-readable medium may also include other non-transitory media, such as secondary or persistent long term storage, like read only memory (ROM), optical or magnetic disks, compact-disc read only memory (CD-ROM), for example. The computer-readable media may also be any other volatile or non-volatile storage system. The computer-readable medium may be considered a computer-readable storage medium, a tangible storage device, or other article of manufacture, for example. The program code (or data for the code) may also be stored or provided on other media including communication media. For instance, the commands may be received on a wireless communication media, for example.

In addition, for FIG. 11 and other processes and methods disclosed herein, each block may represent circuitry that is arranged to perform the specific logical functions in the process.

Functions of FIG. 11 may be fully performed by a control system, or may be distributed across multiple control systems. In some examples, the control system may receive information from sensors of a robotic device, or the control system may receive the information from a processor that collects the information. The control system could further communicate with a remote control system (e.g., a control system on another robotic device) to receive information from sensors of other devices, for example.

At block 1102, data indicating a magnitude of a load on a hydraulic actuator may be received. For instance, control system 402 may receive data indicating a magnitude of a load on a hydraulic actuator of locomotion system 418.

At block 1104, an actuation pressure to actuate the load may be determined based on the magnitude of the load on the hydraulic actuator. For example, based on the magnitude of the load on the hydraulic actuator, control system 402 may determine an actuation pressure to actuate the load.

At block 1106, one or more valves may select one of a first pressure rail at a first pressure or a second pressure rail at a second pressure. For instance, control system 402 may cause switch valve complex 414 to select one of a first pressure rail at a first pressure or a second pressure rail at a second pressure.

At block 1108, the implementation may involve determining that a pressure difference between the pressure of the selected pressure rail and the determined actuation pressure exceeds a tolerated pressure difference. For instance, control system 402 may determine that a pressure difference between the pressure of the selected pressure rail and the determined actuation pressure exceeds a tolerated pressure difference.

At block 1110, responsive to the determination that the pressure difference exceeds the tolerated pressure difference, a metering valve may throttle a flow of hydraulic fluid from the selected pressure rail to the hydraulic actuator such that the hydraulic fluid is at a throttled pressure that is within the tolerated pressure difference from the determined actuation pressure. For instance, control system 402 may cause metering valve(s) 416 to throttle a flow of hydraulic fluid from the selected pressure rail to the hydraulic actuator.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A method comprising:
based on a load on one or more hydraulic actuators of a hydraulic drive system of a robotic device, determining, by a control system of the robotic device, an actuation pressure to actuate the one or more hydraulic actuators;
based on the determined actuation pressure, selecting, by the control system, a pressure rail from among a set of pressure rails at respective pressures, wherein the selected pressure rail supplies pressurized hydraulic fluid at a supply pressure, and wherein the supply pressure is, among the respective pressures, at a lowest pressure that exceeds the determined actuation pressure;

causing, by the control system, one or more valves to connect the selected pressure rail to a metering valve such that hydraulic fluid at approximately the supply pressure flows from the selected pressure rail to the metering valve;

causing, by the control system, the hydraulic drive system to operate in a discrete mode in which the metering valve opens such that hydraulic fluid flows from the selected pressure rail through the metering valve to the one or more hydraulic actuators at approximately the supply pressure;

receiving, by the control system, from one or more sensors on the robotic device, data indicative of one or more physical features of an environment in which the robotic device is operating; and based on the data indicative of the one or more physical features of the environment, causing, by the control system, the hydraulic drive system to operate in a continuous mode in which the metering valve throttles the hydraulic fluid such that the supply pressure is reduced to approximately the determined actuation pressure.

2. The method of claim 1, wherein the robotic device comprises at least one articulable leg, and wherein the at least one articulable leg comprises the one or more hydraulic actuators, the method further comprising:

based on the data indicative of the one or more physical features of the environment, determining that the robotic device is traversing uneven terrain; and in response to determining that the robotic device is traversing uneven terrain, causing the hydraulic drive system to operate in the continuous mode.

3. The method of claim 1, the method further comprising:

receiving data indicating a load that that the robotic device is carrying;

based on the received data, determining that the robotic device is carrying an unbalanced load; and responsive to the determining that the robotic device is carrying the unbalanced load and based on the data indicative of the one or more physical features of the environment, causing the hydraulic drive system to operate in the continuous mode.

4. The method of claim 1, further comprising:

receiving, from the one or more sensors on the robotic device, additional data indicative of one or more additional physical features of the environment in which the robotic device is operating;

based on the additional data indicative of the one or more additional physical features of the environment, causing the hydraulic drive system to operate in the discrete mode.

5. The method of claim 1, wherein the robotic device comprises at least one articulable leg, and wherein the at least one articulable leg comprises the one or more hydraulic actuators, the method further comprising:

based on the data indicative of the one or more physical features of the environment, determining that the robotic device is traversing even terrain; and in response to determining that the robotic device is traversing even terrain, causing the hydraulic drive system to operate in the discrete mode.

6. The method of claim 1, wherein the robotic device comprises at least one articulable leg configured to move the robotic device according to a running gait, and wherein the at least one articulable leg comprises the one or more hydraulic actuators, the method further comprising:

determining that the robotic device is moving according to the running gait; and responsive to the determining that the robotic device is moving according to the running gait, causing the hydraulic drive system to operate in the discrete mode.

7. A hydraulic drive system comprising:

one or more hydraulic actuators of a robotic device;

a plurality of pressure rails at respective pressures;

one or more valves;

a metering valve; and a control system configured to:

based on a load on the one or more hydraulic actuators of the robotic device, determine an actuation pressure to actuate the one or more hydraulic actuators;

based on the determined actuation pressure, select a pressure rail from among the plurality of pressure rails, wherein the selected pressure rail supplies pressurized hydraulic fluid at a supply pressure, and wherein the supply pressure is, among the respective pressures, at a lowest pressure that exceeds the determined actuation pressure;

cause the one or more valves to connect the selected pressure rail to the metering valve such that hydraulic fluid at approximately the supply pressure flows from the selected pressure rail to the metering valve;

cause the hydraulic drive system to operate in a discrete mode in which the metering valve opens such that hydraulic fluid flows from the selected pressure rail through the metering valve to the one or more hydraulic actuators at approximately the supply pressure;

receiving, from one or more sensors on the robotic device, data indicative of one or more physical features of an environment in which the robotic device is operating; and based on the data indicative of the one or more physical features of the environment, cause the hydraulic drive system to operate in a continuous mode in which the metering valve throttles the hydraulic fluid such that the supply pressure is reduced to approximately the determined actuation pressure.

8. The hydraulic drive system of claim 7, wherein the robotic device comprises at least one articulable leg, wherein the at least one articulable leg comprises the one or more hydraulic actuators, and wherein the control system if further configured to:

based on the data indicative of the one or more physical features of the environment, determine that the robotic device is traversing uneven terrain; and in response to determining that the robotic device is traversing uneven terrain, cause the hydraulic drive system to operate in the continuous mode.

9. The hydraulic drive system of claim 7, wherein the control system if further configured to:

receive data indicating a load that that the robotic device is carrying;

based on the received data, determine that the robotic device is carrying an unbalanced load; and responsive to determining that the robotic device is carrying the unbalanced load and based on the data indicative of the one or more physical features of the environment, cause the hydraulic drive system to operate in the continuous mode.

10. The hydraulic drive system of claim 7, wherein the control system if further configured to:
  receive, from the one or more sensors on the robotic device, additional data indicative of one or more additional physical features of the environment in which the robotic device is operating;
  based on the additional data indicative of the one or more additional physical features of the environment, cause the hydraulic drive system to operate in the discrete mode.

11. The hydraulic drive system of claim 7, wherein the robotic device comprises at least one articulable leg, wherein the at least one articulable leg comprises the one or more hydraulic actuators, and wherein the control system if further configured to:
  based on the data indicative of the one or more physical features of the environment, determine that the robotic device is traversing even terrain; and
  in response to determining that the robotic device is traversing even terrain, cause the hydraulic drive system to operate in the discrete mode.

12. The hydraulic drive system of claim 7, wherein the robotic device comprises at least one articulable leg configured to move the robotic device according to a running gait, wherein the at least one articulable leg comprises the one or more hydraulic actuators, and wherein the control system if further configured to:
  determine that the robotic device is moving according to the running gait; and
  responsive to determining that the robotic device is moving according to the running gait, cause the hydraulic drive system to operate in the discrete mode.

13. A non-transitory computer readable medium having stored thereon instructions that, when executed by a computing device, cause the computing device to perform operations comprising:
  based on a load on one or more hydraulic actuators of a hydraulic drive system of a robotic device, determining, by a processor of the computing device, an actuation pressure to actuate the one or more hydraulic actuators;
  based on the determined actuation pressure, selecting, by the processor, a pressure rail from among a set of pressure rails at respective pressures, wherein the selected pressure rail supplies pressurized hydraulic fluid at a supply pressure, and wherein the supply pressure is, among the respective pressures, at a lowest pressure that exceeds the determined actuation pressure;
  causing, by the processor, one or more valves to connect the selected pressure rail to a metering valve such that hydraulic fluid at approximately the supply pressure flows from the selected pressure rail to the metering valve;
  causing, by the processor, the hydraulic drive system to operate in a discrete mode in which the metering valve opens such that hydraulic fluid flows from the selected pressure rail through the metering valve to the one or more hydraulic actuators at approximately the supply pressure;
  receiving, by the processor, from one or more sensors on the robotic device, data indicative of one or more physical features of an environment in which the robotic device is operating; and
  based on the data indicative of the one or more physical features of the environment, causing, by the processor, the hydraulic drive system to operate in a continuous mode in which the metering valve throttles the hydraulic fluid such that the supply pressure is reduced to approximately the determined actuation pressure.

14. The non-transitory computer readable medium of claim 13, wherein the robotic device comprises at least one articulable leg, wherein the at least one articulable leg comprises the one or more hydraulic actuators, and wherein the operations further comprise:
  based on the data indicative of the one or more physical features of the environment, determining that the robotic device is traversing uneven terrain; and
  in response to determining that the robotic device is traversing uneven terrain, causing the hydraulic drive system to operate in the continuous mode.

15. The non-transitory computer readable medium of claim 13, wherein the operations further comprise:
  receiving data indicating a load that that the robotic device is carrying;
  based on the received data, determining that the robotic device is carrying an unbalanced load; and
  responsive to determining that the robotic device is carrying the unbalanced load and based on the data indicative of the one or more physical features of the environment, causing the hydraulic drive system to operate in the continuous mode.

16. The non-transitory computer readable medium of claim 13, wherein the operations further comprise:
  receiving, from the one or more sensors on the robotic device, additional data indicative of one or more additional physical features of the environment in which the robotic device is operating;
  based on the additional data indicative of the one or more additional physical features of the environment, causing the hydraulic drive system to operate in the discrete mode.

17. The non-transitory computer readable medium of claim 13, wherein the robotic device comprises at least one articulable leg configured to move the robotic device according to a running gait, wherein the at least one articulable leg comprises the one or more hydraulic actuators, and wherein the operations further comprise:
  determining that the robotic device is moving according to the running gait; and
  responsive to determining that the robotic device is moving according to the running gait, causing the hydraulic drive system to operate in the discrete mode.

18. The method of claim 1, wherein the robotic device comprises at least one articulable leg, and wherein the at least one articulable leg comprises the one or more hydraulic actuators, the method further comprising:
  determining that the robotic device is moving according to a climbing gait; and
  in response to determining that the robotic device is moving according to the climbing gait and based on the data indicative of the one or more physical features of the environment, causing the hydraulic drive system to operate in the continuous mode.

19. The hydraulic drive system of claim 7, wherein the robotic device comprises at least one articulable leg, wherein the at least one articulable leg comprises the one or more hydraulic actuators, and wherein the control system is further configured to:
  determine that the robotic device is moving according to a climbing gait; and
  in response to determining that the robotic device is moving according to the climbing gait and based on the data indicative of the one or more physical features of the environment, cause the hydraulic drive system to operate in the continuous mode.

20. The non-transitory computer readable medium of claim 13, wherein the robotic device comprises at least one articulable leg, wherein the at least one articulable leg comprises the one or more hydraulic actuators, and wherein the operations further comprise:
- based on the data indicative of the one or more physical features of the environment, determining that the robotic device is traversing even terrain; and
- in response to determining that the robotic device is traversing even terrain, causing the hydraulic drive system to operate in the discrete mode.

* * * * *